(12) United States Patent
Saito

(10) Patent No.: US 8,077,402 B2
(45) Date of Patent: Dec. 13, 2011

(54) IMAGING LENS

(75) Inventor: Tomohiro Saito, Kawaguchi (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 12/589,458

(22) Filed: Oct. 21, 2009

(65) Prior Publication Data

US 2010/0103536 A1  Apr. 29, 2010

(30) Foreign Application Priority Data

Oct. 23, 2008  (JP) .................................. 2008-272966

(51) Int. Cl.
*G02B 9/04*  (2006.01)
(52) U.S. Cl. ...................................... 359/739; 359/793
(58) Field of Classification Search .................. 359/739, 359/754–758, 763–766, 771–778, 784, 785, 359/793, 795
See application file for complete search history.

(56) References Cited

U.S. PATENT DOCUMENTS

| 3,438,696 A | * | 4/1969 | Ruben | 359/789 |
| 3,567,304 A | * | 3/1971 | Kruger | 359/356 |
| 6,813,100 B2 | * | 11/2004 | Yamaguchi et al. | 359/793 |
| 7,035,024 B2 | * | 4/2006 | Nagai et al. | 359/785 |

FOREIGN PATENT DOCUMENTS

| JP | 2004-170883 | 6/2004 |
| JP | 2006-119331 | 5/2006 |

\* cited by examiner

*Primary Examiner* — Darryl J Collins
(74) *Attorney, Agent, or Firm* — DLA Piper LLP (US)

(57) ABSTRACT

It is to provide an imaging lens that can improve optical performance while reducing size and weight.
An imaging lens includes, in order from an object side to an image surface side, a diaphragm, a first lens that is a biconvex lens, and a second lens that is a lens having a negative power whose concave surface faces the object side, wherein conditions expressed by the following expressions are to be satisfied: $-0.3 \leq r_1/r_2 < -0.1$ and $0.8 \leq f_1/FL \leq 0.98$ (where, $r_1$: center radius curvature of the object side face of the first lens, $r_2$: center radius curvature of the image surface side face of the first lens, $f_1$: focal distance of the first lens, and FL: focal distance of the entire lens system).

5 Claims, 14 Drawing Sheets

[Fig.1]
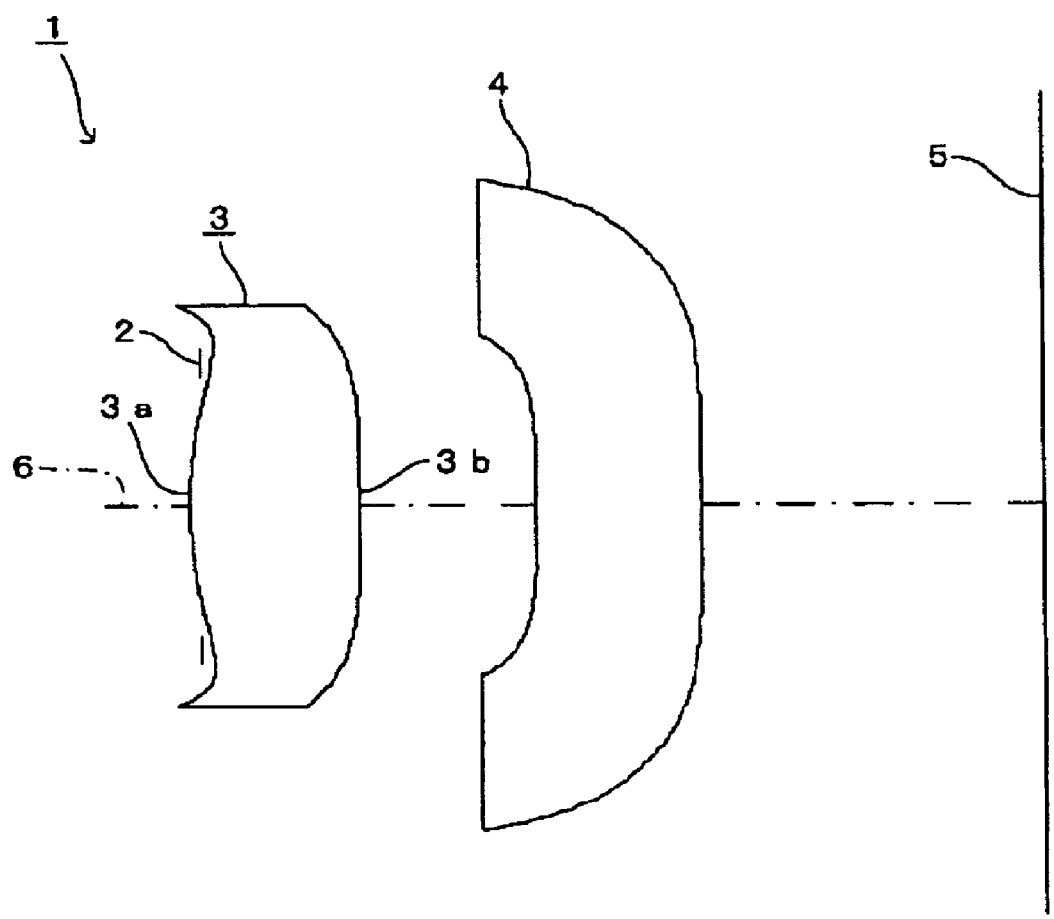

[Fig.2]
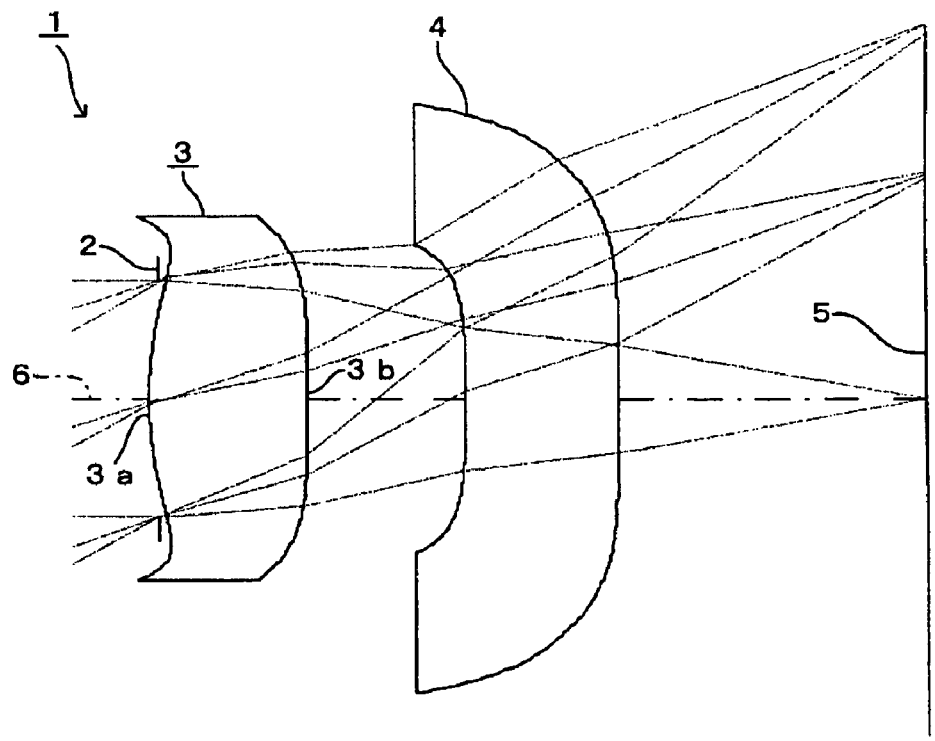
[Fig.3]
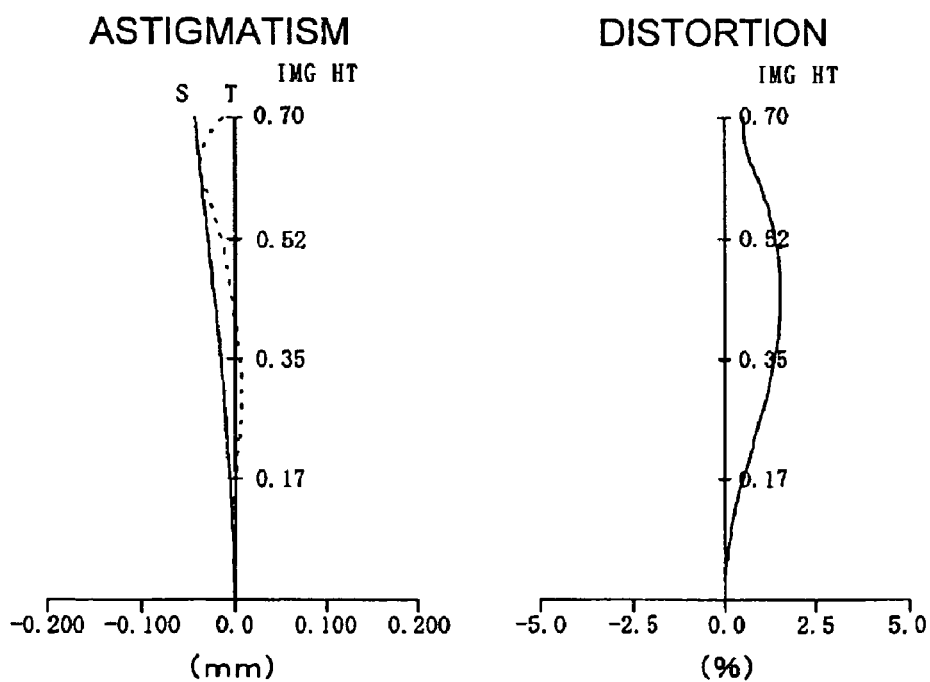

[Fig.4]
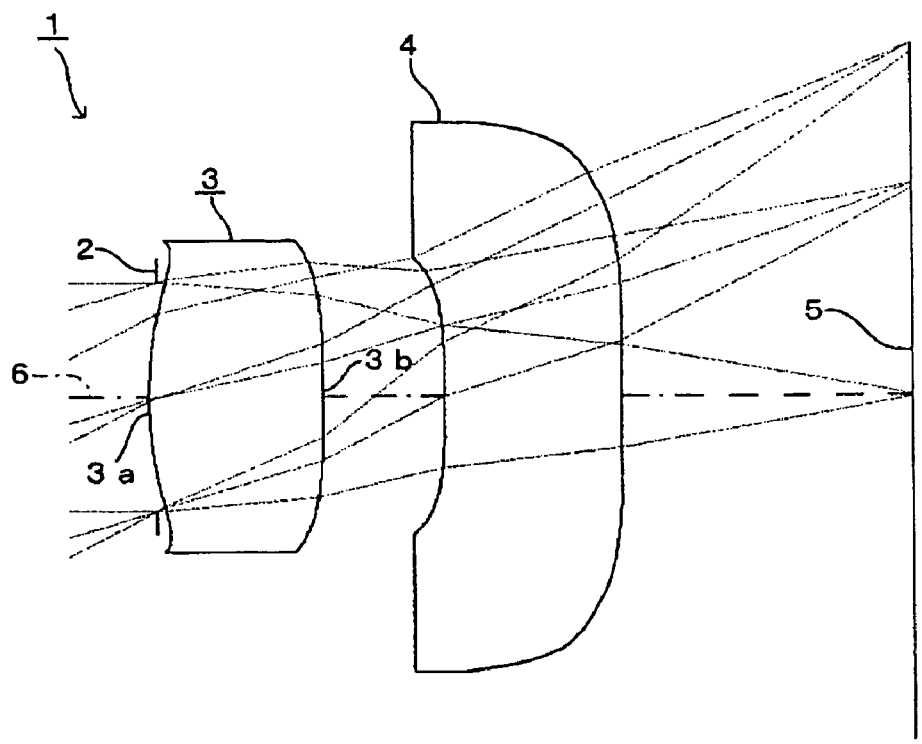
[Fig.5]
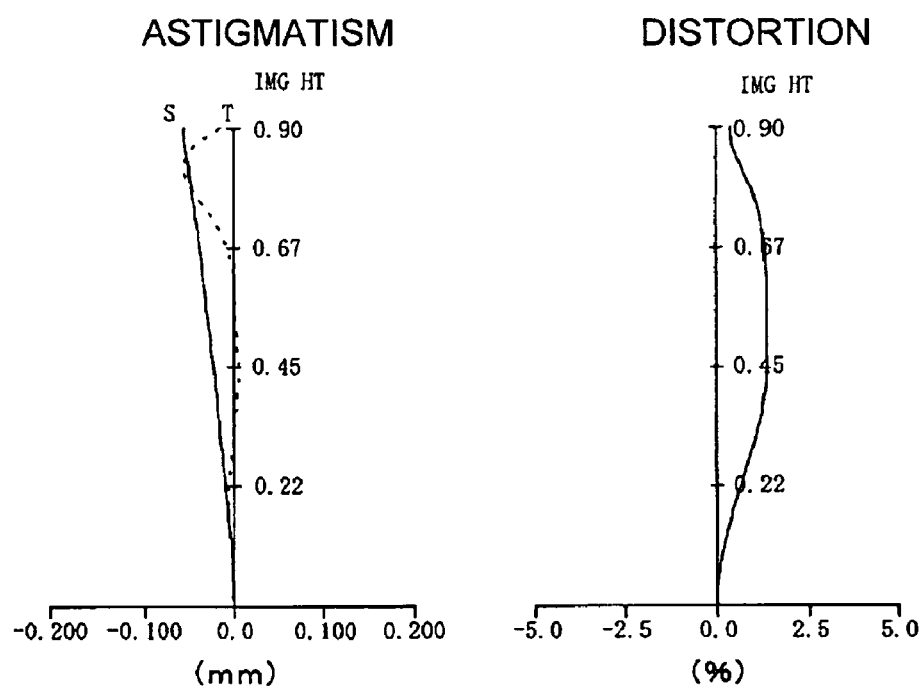

[Fig.6]
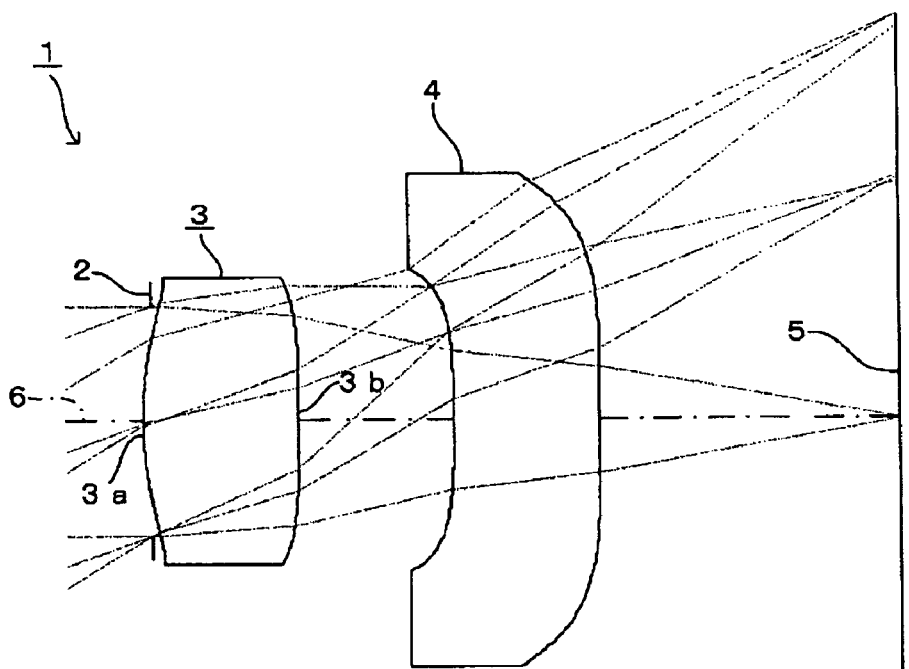
[Fig.7]
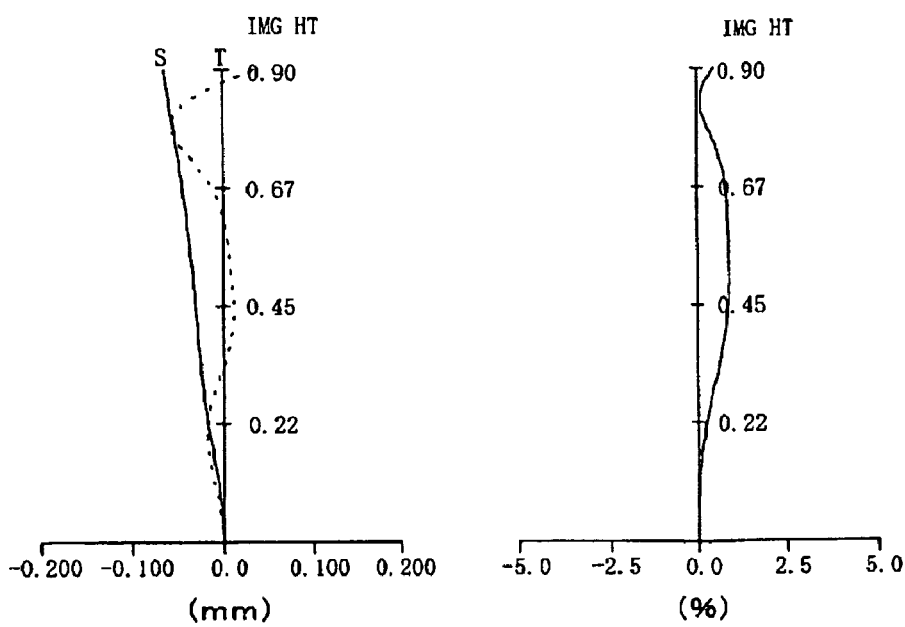

[Fig.8]
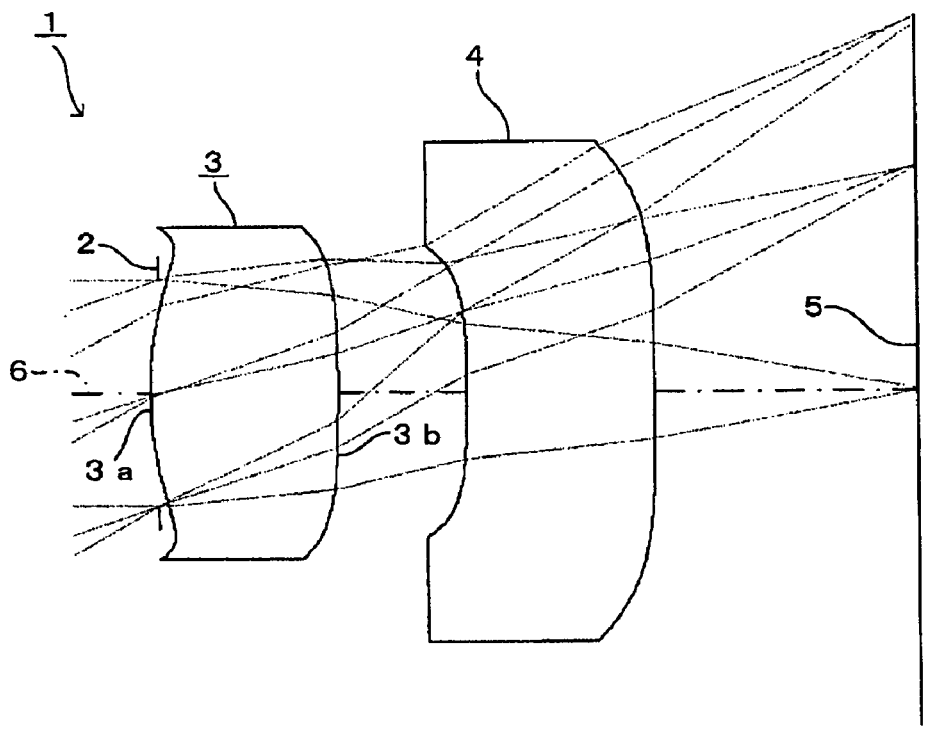
[Fig.9]
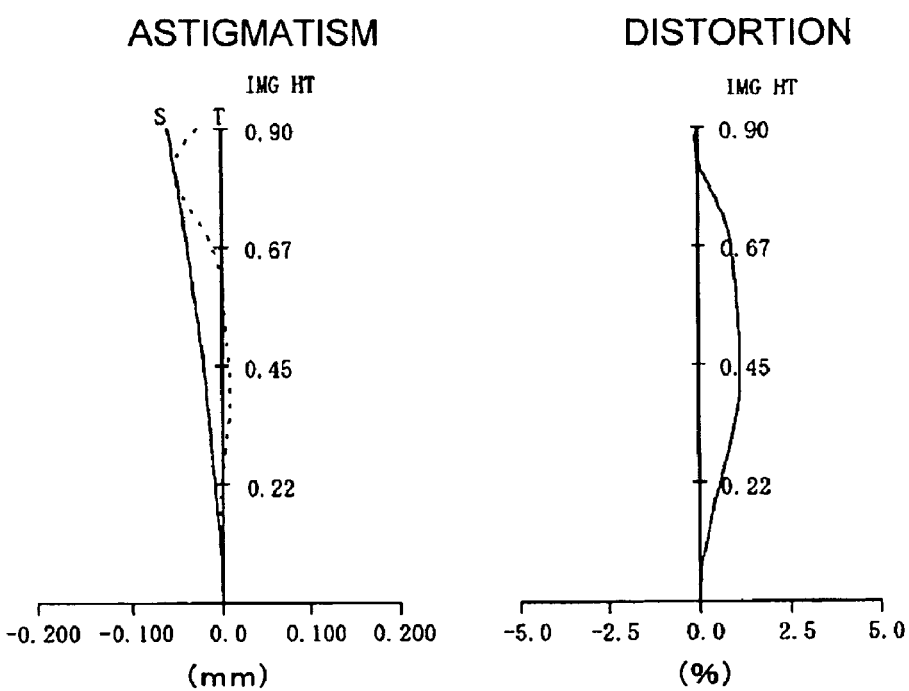

[Fig.10]
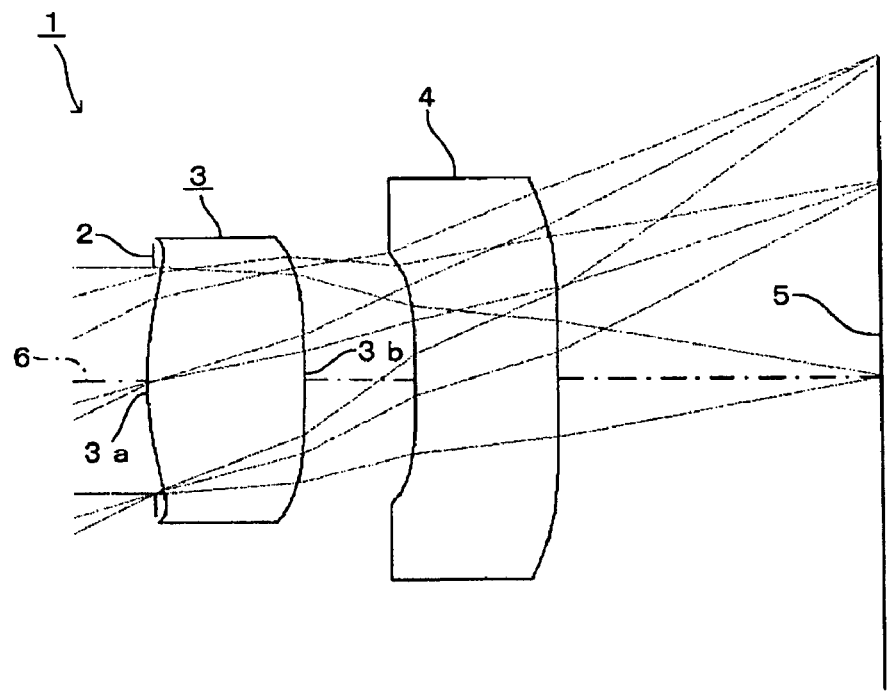
[Fig.11]
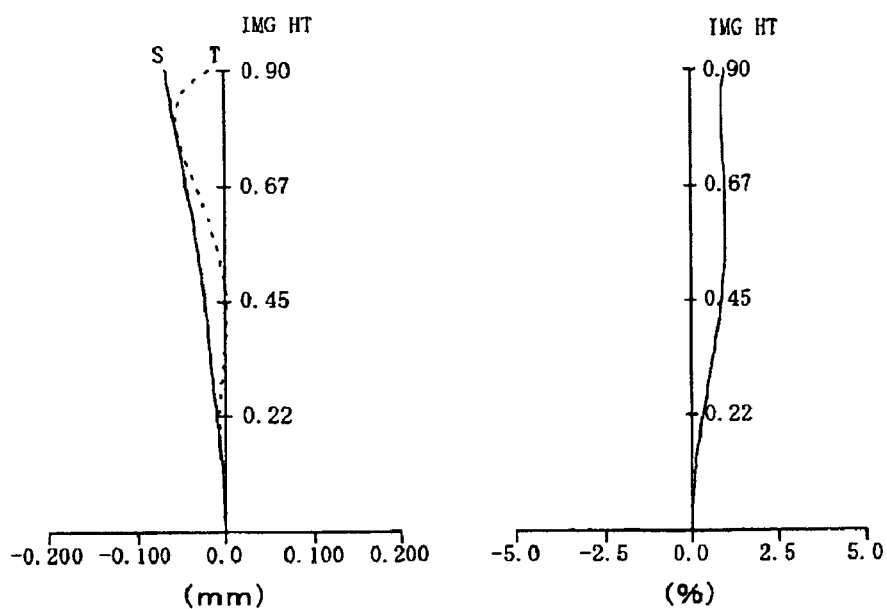

[Fig.12]
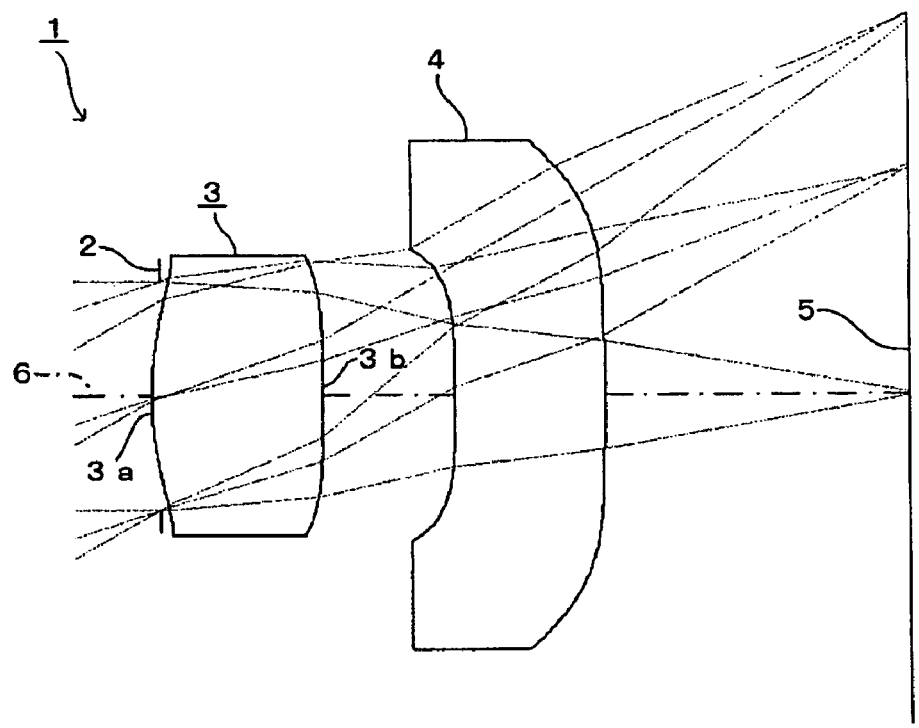
[Fig.13]
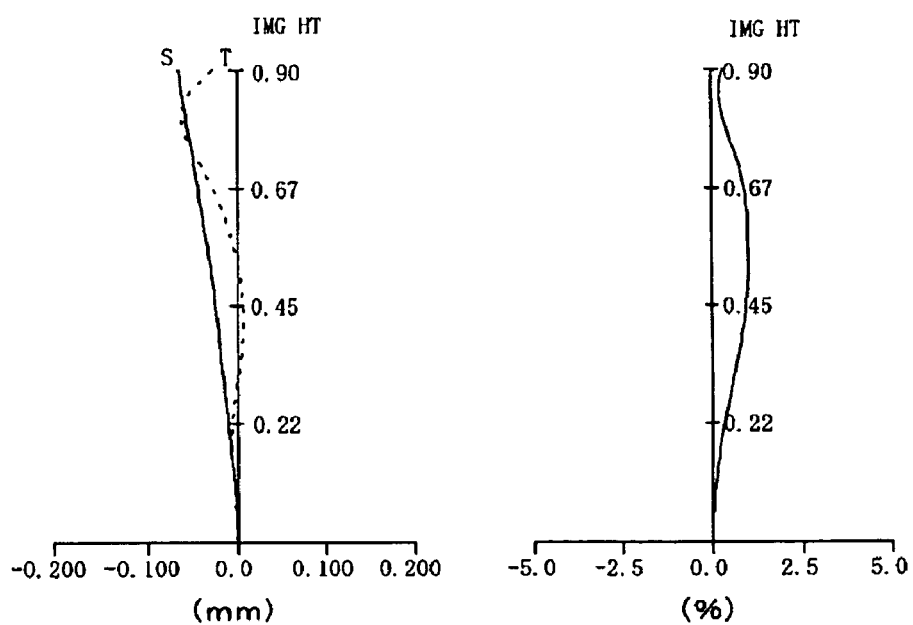

[Fig.14]
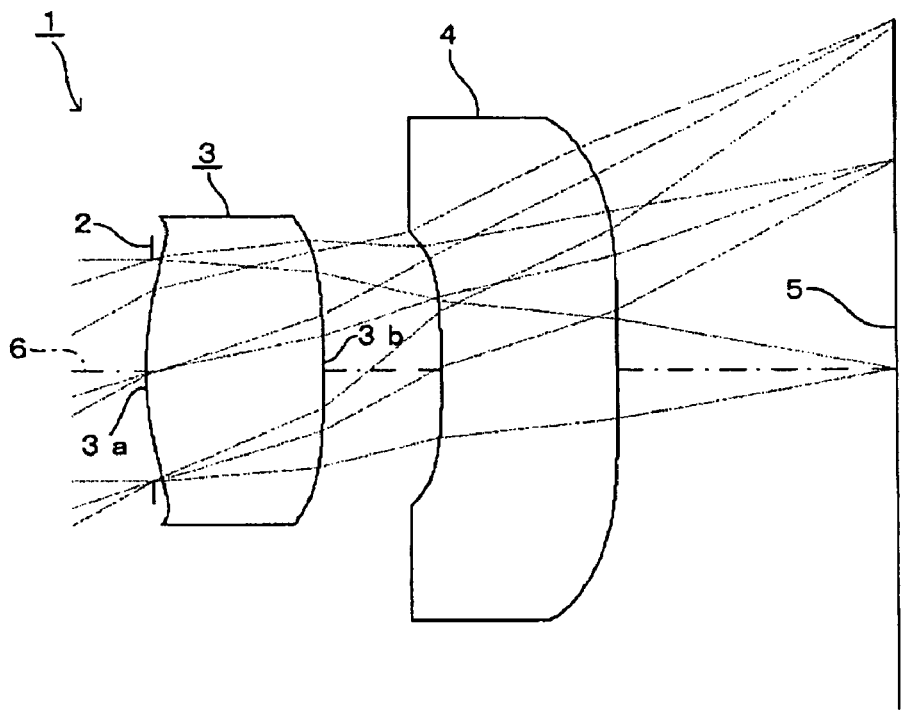
[Fig.15]
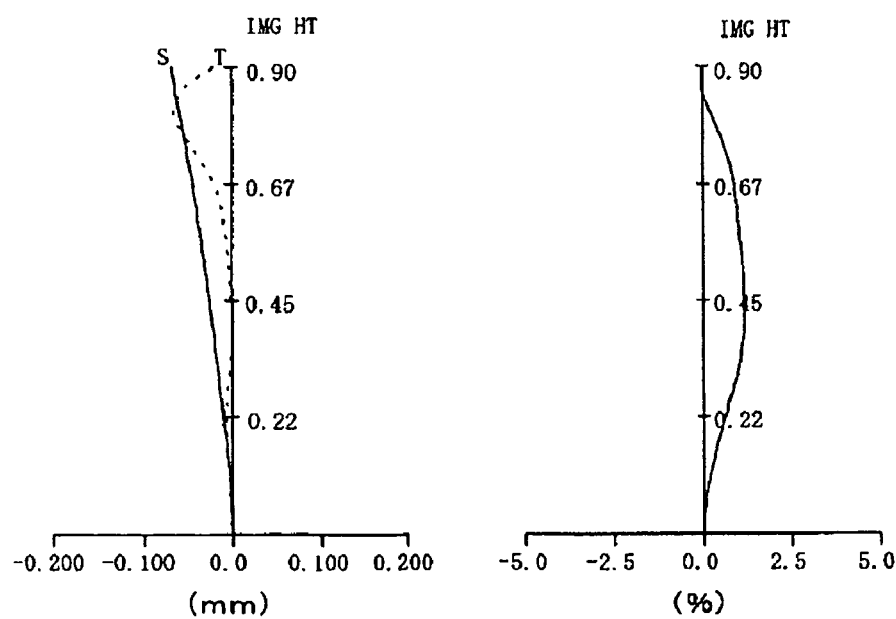

[Fig.16]
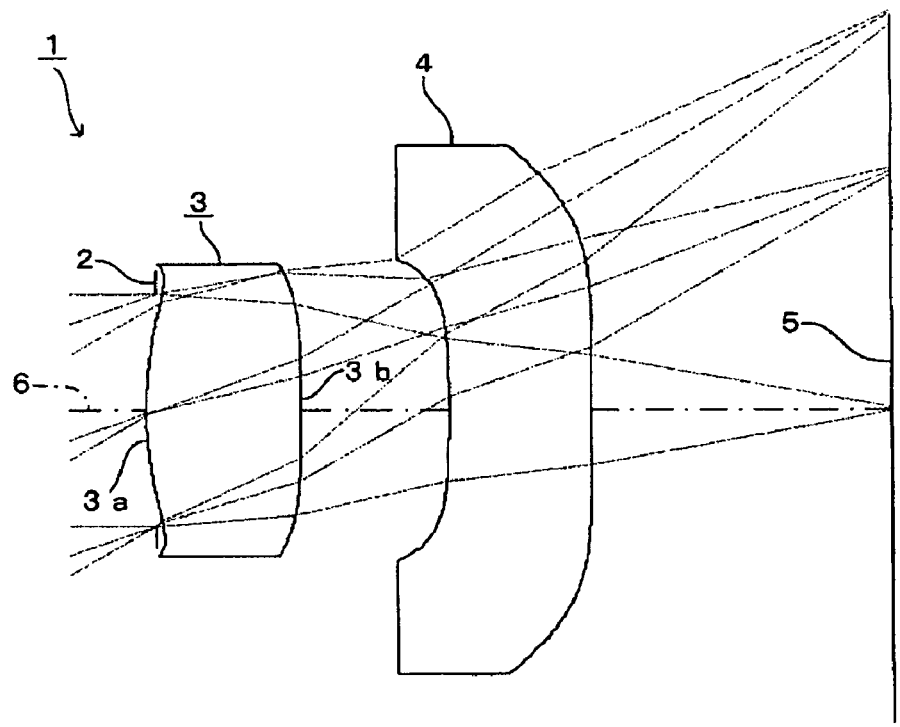
[Fig.17]
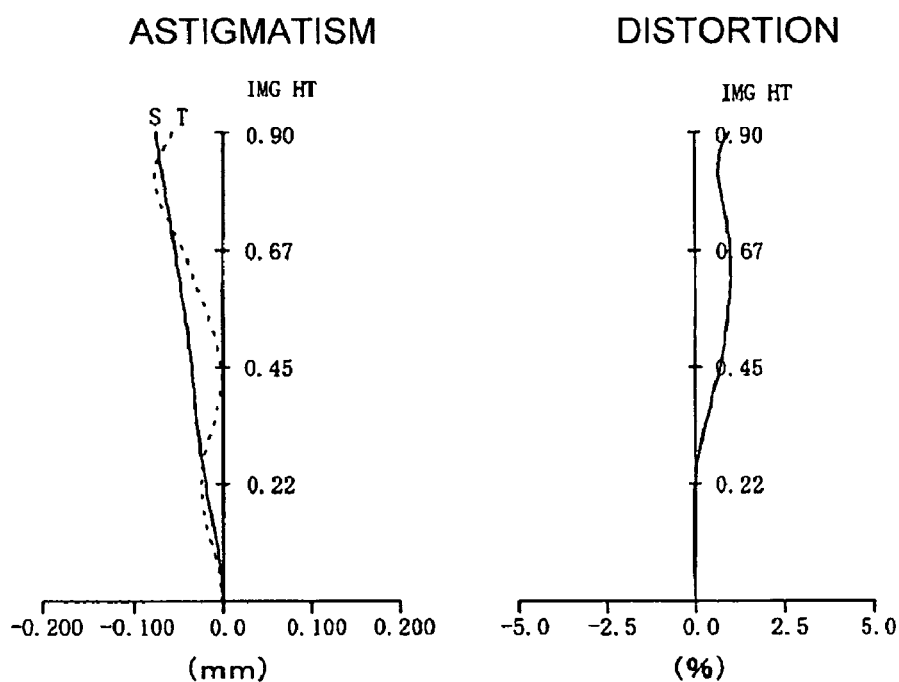

[Fig.18]
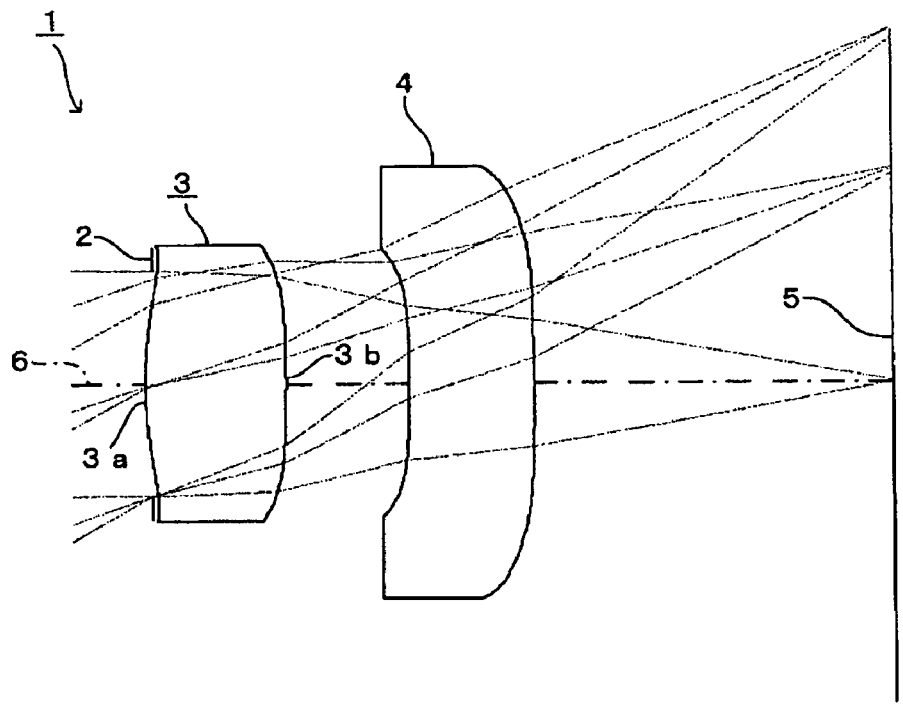
[Fig.19]
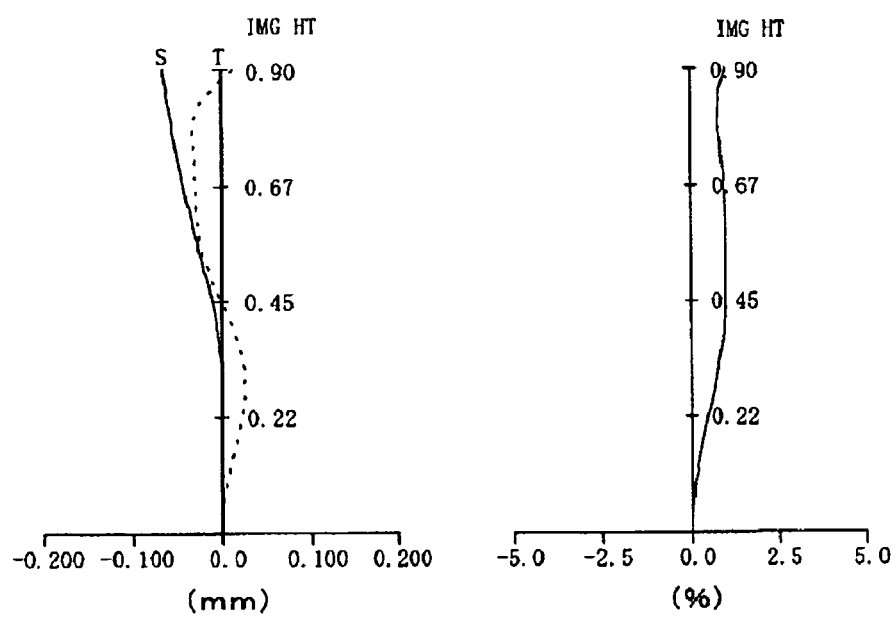

[Fig.20]
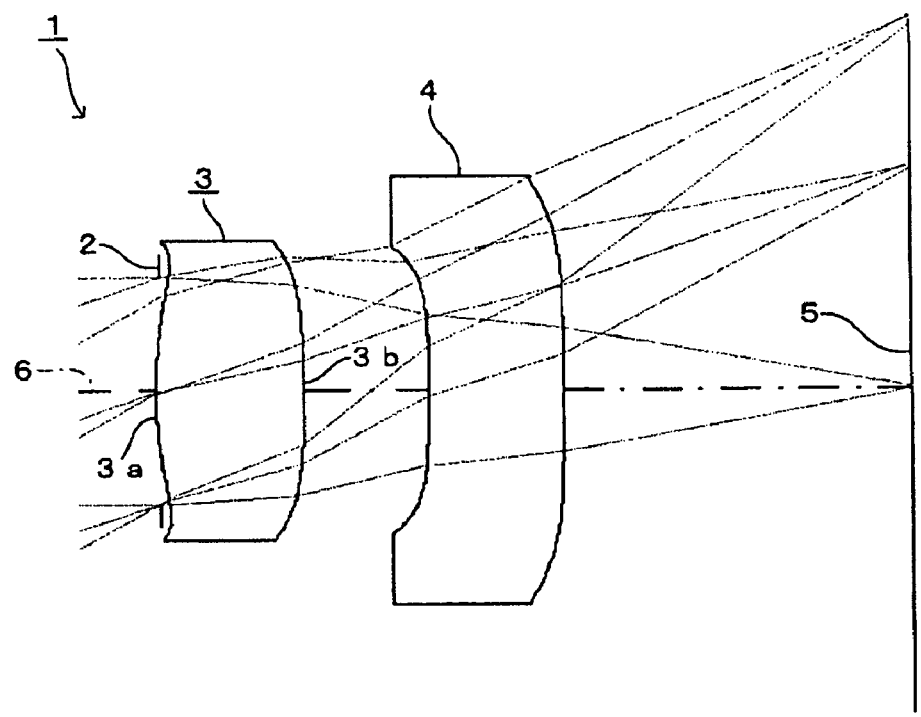
[Fig.21]
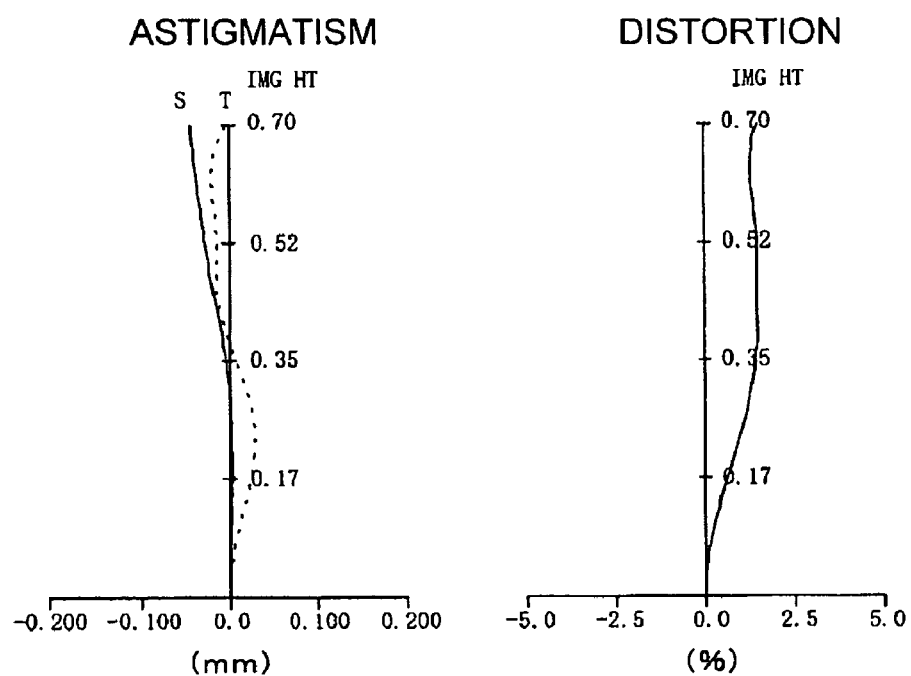

[Fig.22]
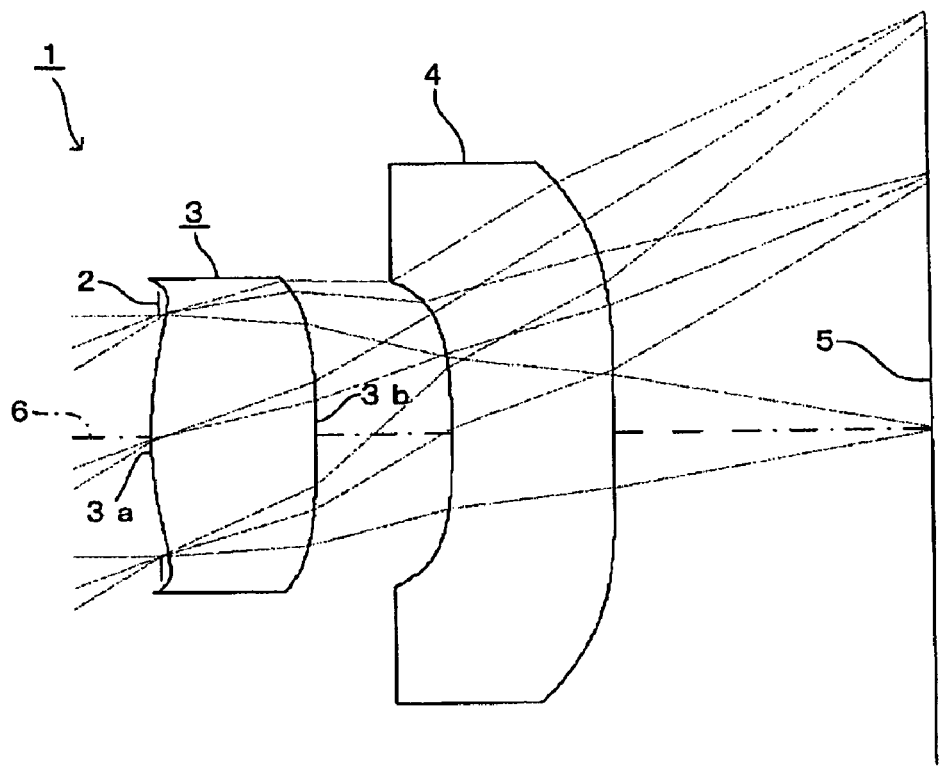
[Fig.23]
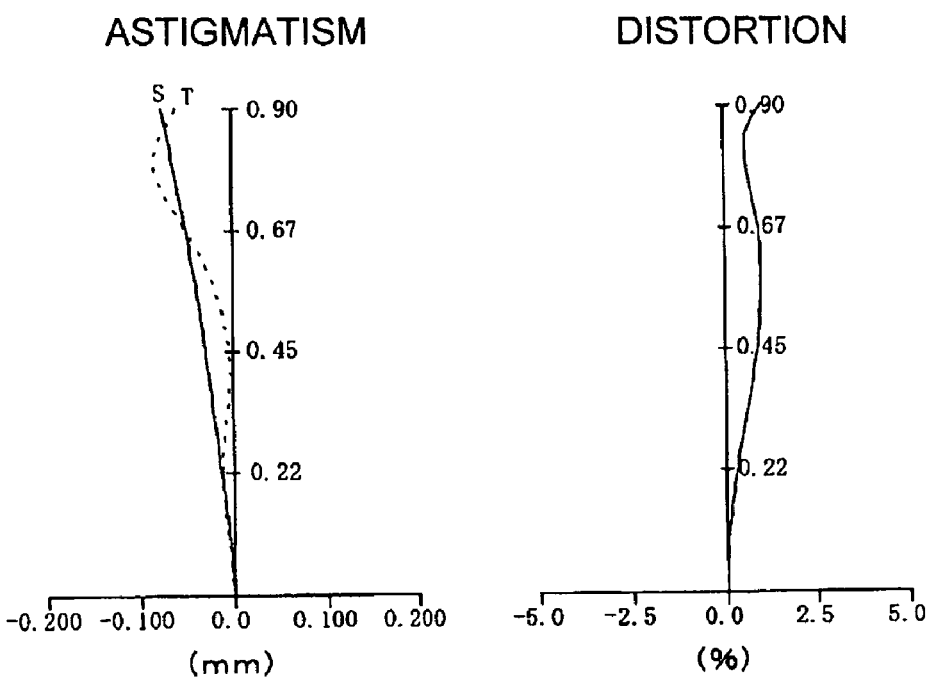

[Fig.24]
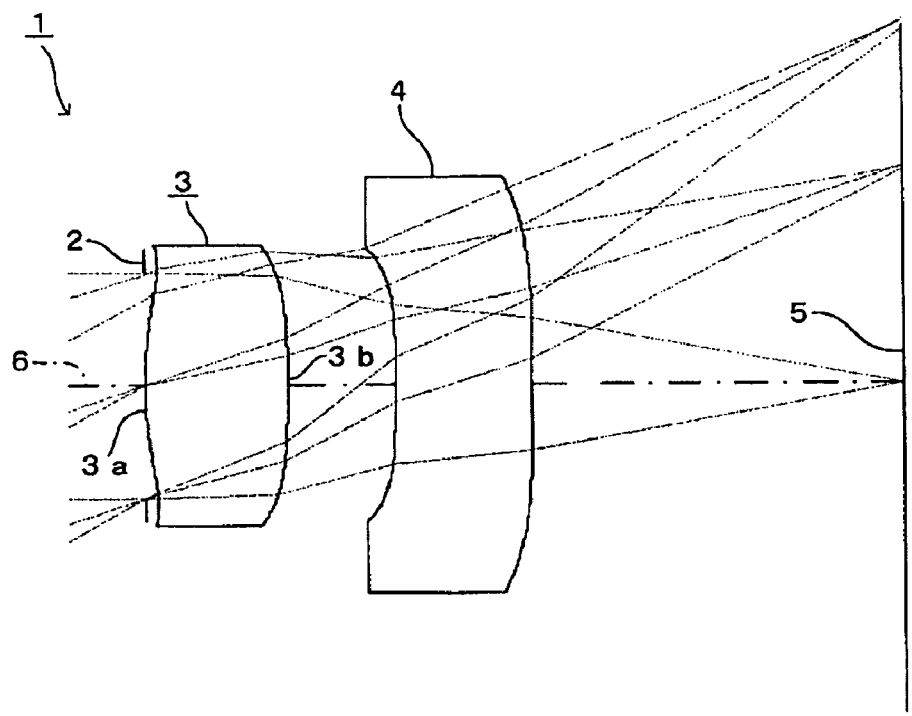
[Fig.25]
ASTIGMATISM          DISTORTION
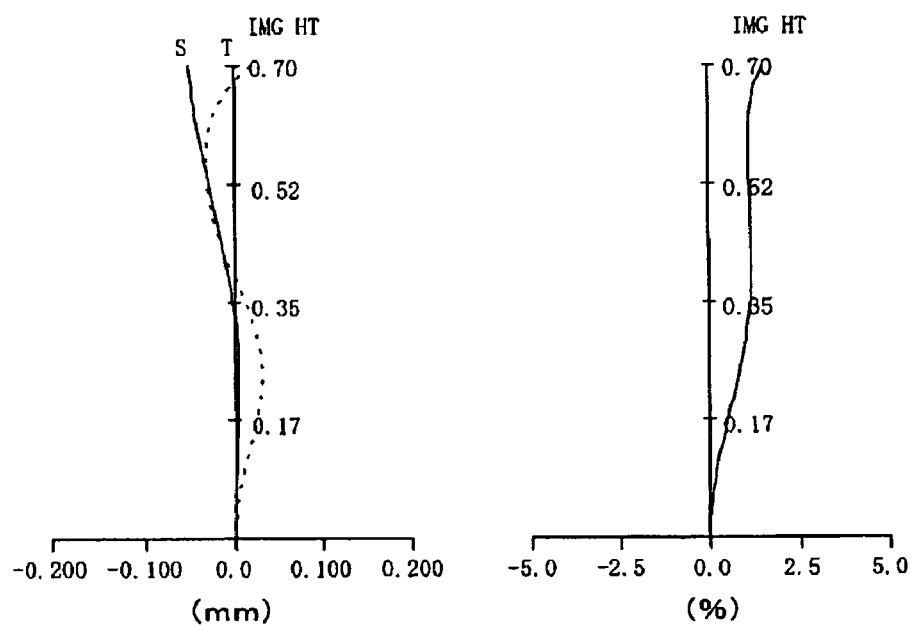

[Fig.26]
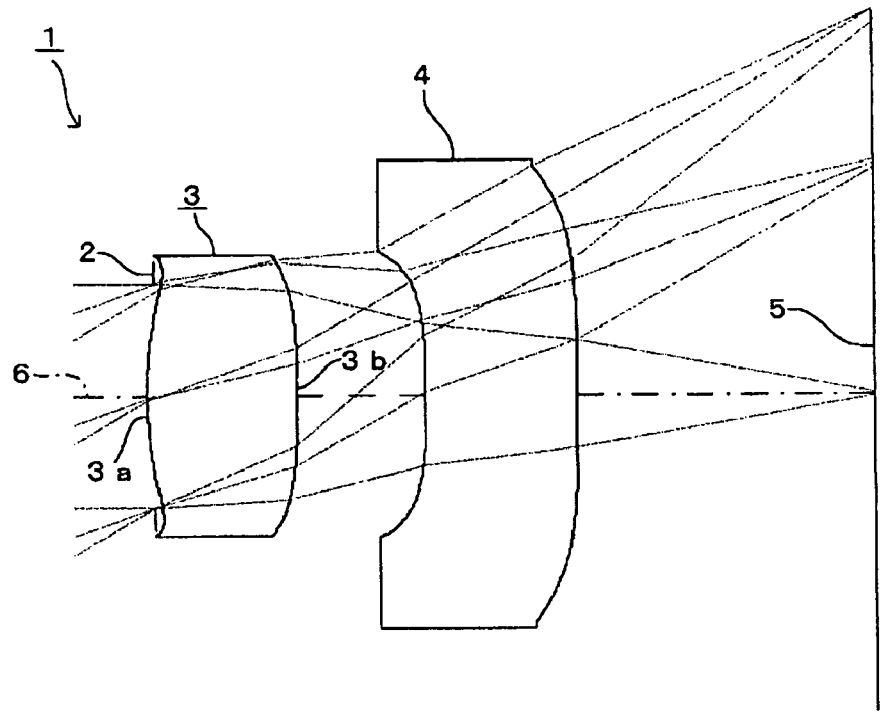
[Fig.27]
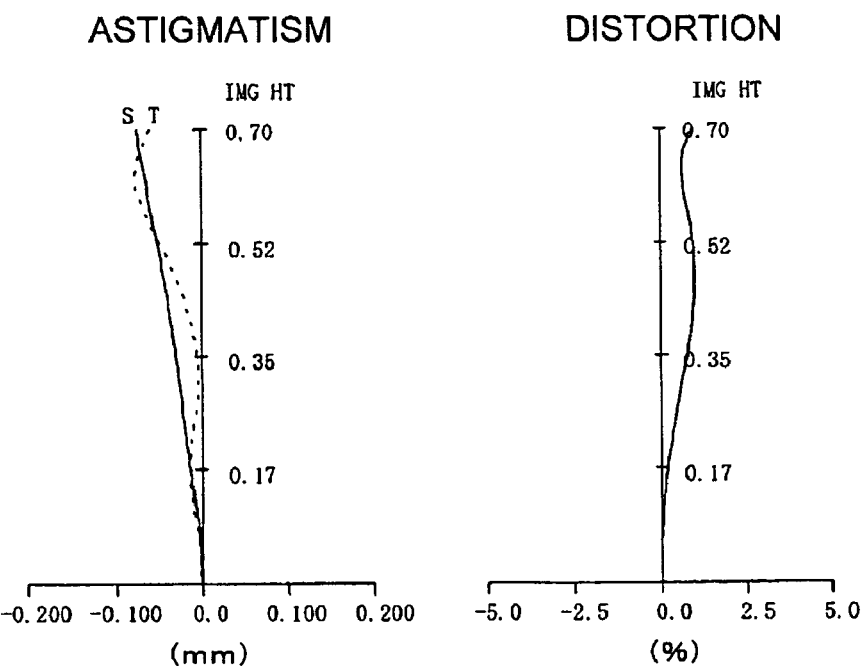

IMAGING LENS

BACKGROUND OF THE INVENTION

1. Field of the Invention

The present invention relates to an imaging lens. In particular, the present invention relates to an imaging lens of a two-lens structure that is capable of reducing size and weight and enhancing optical performance. The imaging lens is used for an image-taking device that forms an image of an object, such as scenery and human figures, on an image-taking surface of a solid image pickup element such as a CCD, CMOS, etc. The solid image pickup element is mounted on a portable computer, a television phone, a portable phone, and the like.

2. Description of the Related Art

Recently, there has been an increasing demand for cameras that utilize a solid image pickup element, such as a CCD, CMOS, or the like, which is mounted on a portable phone, a portable computer, and a television phone, for example. It is demanded that a camera such as this is small and light because the camera is required to be mounted on a limited installation space.

Further, in recent years, there has been an increasing demand for a high-optical-performance lens system capable of sufficiently utilizing resolution capabilities of a solid image pickup element having a high resolution exceeding one million pixels. Achieving a balance between size and weight reduction and improvement in optical performance is becoming increasingly important.

From this perspective, a two-lens structure lens system that is smaller and lighter than a three-lens structure lens system and superior to a single-lens structure lens system in optical performance is advantageous. Lens systems, such as those described in Patent Literatures 1 and 2, have been proposed as such two-lens structure lens systems.

[Patent Literature 1] Japanese Patent Unexamined Publication No. 2006-119331
[Patent Literature 2] Japanese Patent Unexamined Publication No. 2004-170883

DISCLOSURE OF THE INVENTION

Problems to be Solved the Invention

However, in the lens systems described in Patent Literature 1 and Patent Literature 2, achieving both size and weight reduction and improvement in optical performance is difficult because, in both lens systems, a value obtained by a center radius curvature of a surface of a first lens on an object side being divided by a center radius curvature of a surface of the first lens on an image surface side is not set within a suitable range, and the second lens has a positive power.

The present invention has been achieved in light of the above-described problems. An object of the invention is to provide an imaging lens having improved optical performance while being reduced in size and weight.

SUMMARY OF THE INVENTION

In order to achieve the aforementioned object, an imaging lens according to a first aspect of the present invention is an imaging lens used for forming an image of an object on an image-taking surface of an image sensor element including, in order from an object side to an image surface side: a diaphragm, a first lens that is a biconvex lens, and a second lens that is a lens having a negative power whose concave surface faces the object side, wherein conditions expressed by the following expressions (1) and (2) are to be satisfied:

$$-0.3 \leq r_1/r_2 < -0.1 \quad (1)$$

$$0.8 \leq f_1/FL \leq 0.98 \quad (2)$$

where, $r_1$: center radius curvature of the object side face of the first lens $r_2$: center radius curvature of the image surface side face of the first lens $f_1$: focal distance of the first lens FL: focal distance of the entire lens system.

In the invention, when the diaphragm is disposed closest to the object side, positioning of the diaphragm in a same position in an optical axis direction as a point on the optical axis (referred to, hereinafter, as a surface apex) of a surface (convex surface) of the first lens on the object side cannot be avoided. In addition, the surface apex and surrounding area of the surface of the first lens on the object side passing through the diaphragm and being positioned (projecting) closer to the object side than the diaphragm cannot be avoided. Even in this instance, because the diaphragm is physically positioned closer to the object side than the overall first lens, the configuration does not depart from the description in the scope of claims. To reduce the size of the optical system, the diaphragm is preferably positioned closer to the image surface side than the surface apex of the surface of the first lens on the object side.

In the invention according to the first aspect, the diaphragm is disposed closest to the object side. The first lens is a biconvex lens. The second lens is a negative lens whose concave surface faces the object side. In addition, the conditions expressed by the expressions (1) and (2) are satisfied. Therefore, telecentricity can be ensured, various aberrations can be effectively corrected, and optical performance can be improved while achieving size and weight reduction. Furthermore, productivity can be improved.

Productivity, herein, means not only the productivity for mass-producing the imaging lens (such as moldability and cost when the imaging lens is mass-produced by injection molding), but also easiness of processing, manufacture, etc. of equipment used for manufacturing the imaging lens (such as easiness of processing a mold used for injection molding) (the same applies hereinafter).

An imaging lens according to a second aspect is the imaging lens according to the first aspect in which a condition expressed by a following expression (3) is further satisfied:

$$0.65 \leq d_2/d_1 \leq 1.25 \quad (3)$$

where, $d_1$: center thickness of the first lens $d_2$: distance between the first lens and the second lens on the optical axis.

In the invention according to the second aspect, the expression (3) is further satisfied. Therefore, a means for effectively blocking unnecessary light can be appropriately employed while maintaining productivity.

An imaging lens according to a third aspect is the imaging lens according to the first aspect in which a condition expressed by a following expression (4) is further satisfied:

$$0.65 \leq d_2/d_3 \leq 1.2 \quad (4)$$

where, $d_2$: distance between the first lens and the second lens on the optical axis.

$d_3$: center thickness of the second lens.

In the invention according to the third aspect, the expression (4) is further satisfied. Therefore, a means for effectively blocking unnecessary light can be appropriately employed while maintaining productivity.

An imaging lens according to a fourth aspect is the imaging lens according to the first aspect in which a condition expressed by a following expression (5) is further satisfied:

$$0.1 \leq d_1/FL \leq 0.3 \tag{5}$$

where, $d_1$: center thickness of the first lens.

In the invention according to the fourth aspect, the expression (5) is further satisfied. Therefore, excellent balance can be achieved between size and weight reduction and maintenance of productivity.

An imaging lens according to a fifth aspect is the imaging lens according to the first aspect in which a condition expressed by a following expression (6) is further satisfied:

$$0.1 \leq d_3/FL \leq 0.3 \tag{6}$$

where, $d_3$: center thickness of the second lens.

In the invention according to the fifth aspect, the expression (6) is further satisfied. Therefore, productivity can be maintained while reducing size and weight.

An imaging lens according to a sixth aspect is the imaging lens according to the first aspect in which a condition expressed by a following expression (7) is further satisfied:

$$0.9 \leq L/FL \leq 1.2 \tag{7}$$

where,

L: overall length of the lens system (distance from the surface closest to the object side to the image-taking surface on the optical axis: equivalent air length).

In the invention according to the sixth aspect, the expression (7) is further satisfied. Therefore, balance can be achieved between size and weight reduction and maintenance of productivity.

In the imaging lens of the present invention, optical performance can be improved while achieving size and weight reduction.

Effects of the Invention

With the imaging lens according to the present invention, optical performance can be improved while achieving size and weight reduction.

BRIEF DESCRIPTION OF THE DRAWINGS

FIG. 1 is a schematic diagram for showing an embodiment of the imaging lens according to the present invention;

FIG. 2 is a schematic diagram for showing FIRST EXAMPLE of the imaging lens according to the present invention;

FIG. 3 shows graphs for describing the astigmatism and distortion of the imaging lens shown in FIG. 2;

FIG. 4 is a schematic diagram for showing SECOND EXAMPLE of the imaging lens according to the present invention;

FIG. 5 shows graphs for describing the astigmatism and distortion of the imaging lens shown in FIG. 4;

FIG. 6 is a schematic diagram for showing THIRD EXAMPLE of the imaging lens according to the present invention;

FIG. 7 shows graphs for describing the astigmatism and distortion of the imaging lens shown in FIG. 6;

FIG. 8 is a schematic diagram for showing FOURTH EXAMPLE of the imaging lens according to the present invention;

FIG. 9 shows graphs for describing the astigmatism and distortion of the imaging lens shown in FIG. 8;

FIG. 10 is a schematic diagram for showing FIFTH EXAMPLE of the imaging lens according to the present invention;

FIG. 11 shows graphs for describing the astigmatism and distortion of the imaging lens shown in FIG. 10;

FIG. 12 is a schematic diagram for showing SIXTH EXAMPLE of the imaging lens according to the present invention;

FIG. 13 shows graphs for describing the astigmatism and distortion of the imaging lens shown in FIG. 12;

FIG. 14 is a schematic diagram for showing SEVENTH EXAMPLE of the imaging lens according to the present invention;

FIG. 15 shows graphs for describing the astigmatism and distortion of the imaging lens shown in FIG. 14;

FIG. 16 is a schematic diagram for showing EIGHTH EXAMPLE of the imaging lens according to the present invention;

FIG. 17 shows graphs for describing the astigmatism and distortion of the imaging lens shown in FIG. 16;

FIG. 18 is a schematic diagram for showing NINTH EXAMPLE of the imaging lens according to the present invention;

FIG. 19 shows graphs for describing the astigmatism and distortion of the imaging lens shown in FIG. 18;

FIG. 20 is a schematic diagram for showing TENTH EXAMPLE of the imaging lens according to the present invention;

FIG. 21 shows graphs for describing the astigmatism and distortion of the imaging lens shown in FIG. 20;

FIG. 22 is a schematic diagram for showing ELEVENTH EXAMPLE of the imaging lens according to the present invention;

FIG. 23 shows graphs for describing the astigmatism and distortion of the imaging lens shown in FIG. 22;

FIG. 24 is a schematic diagram for showing TWELFTH EXAMPLE of the imaging lens according to the present invention;

FIG. 25 shows graphs for describing the astigmatism and distortion of the imaging lens shown in FIG. 24;

FIG. 26 is a schematic diagram for showing THIRTEENTH EXAMPLE of the imaging lens according to the present invention;

FIG. 27 shows graphs for describing the astigmatism and distortion of the imaging lens shown in FIG. 26;

DETAILED DESCRIPTION OF THE PREFERRED EMBODIMENT

An embodiment of the imaging lens according to the present invention will be described hereinafter with reference to FIG. 1.

As shown in FIG. 1, an imaging lens 1 according to the embodiment includes, in order from an object side toward an image surface side, a diaphragm 2, a first lens 3 made of resin that is a biconvex lens, and a second lens 4 made of resin that is a lens having a negative power whose concave surface faces the object side.

Respective lens surfaces of the first lens 3 and the second lens 4 on the object side are referred to as a first face. Respective lens surfaces of the first lens 3 and the second lens 4 on the image surface side are referred to as a second face.

According to the embodiment, an image-taking surface 5 that is a light-receiving surface of an image sensor element, such as a charge-coupled device (CCD) or a complementary metal oxide semiconductor (CMOS), is disposed on the second face side of the second lens 4.

Various filters, such as a cover glass, an infrared (IR) cut filter, and a low-pass filter, may be disposed as required between the second face of the second lens 4 and the image-taking surface 5. The IR cut filter may be formed on any one lens surface, such as a second face 3b of the first lens 3, or on a plurality of lens surfaces, among the lens surfaces of the first lens 3 and the second lens 4.

In this way, according to the embodiment, high telecentricity can be ensured as a result of the diaphragm 2 being positioned closest to the object side and an exit pupil position being positioned away from the image-taking surface 5. Therefore, an incidence angle of a light beam incident on a sensor of the image sensor element can be relaxed.

Moreover, according to the embodiment, conditions expressed by following expressions (1) and (2) are satisfied:

$$-0.3 \leq r_1/r_2 \leq -0.1 \quad (1)$$

$$0.8 \leq f_1/FL \leq 0.98 \quad (2)$$

where, $r_1$ in the expression (1) is a center radius curvature of a first face 3a of the first lens 3 (the same applies hereinafter). $r_2$ in the expression (1) is a center radius curvature of the second face 3b of the first lens 3 (the same applies hereinafter). $f_1$ in the expression (2) is a focal distance of the first lens 3 (the same applies hereinafter). FL in the expression (2) is a focal distance of the entire lens system (the same applies hereinafter).

Here, when the value of $r_1/r_2$ is less than the value (−0.3) shown in the expression (1), the power of the first face 3a of the first lens 3 becomes too small in relation to the power of the second face 3b of the first lens 3. Size and weight reduction of the overall optical system becomes difficult to achieve. On the other hand, when the value of $r_1/r_2$ is the value (−0.1) shown in the expression (1) or more, the center radius curvature of the first face 3a of the first lens 3 become too small in relation to the center radius curvature of the second face 3b of the first lens 3. An injection-molding mold used to manufacture the first lens 3 by injection molding becomes difficult to manufacture.

When the value of $f_1/FL$ is less than the value (0.8) shown in the expression (2), the power of the first lens 3 becomes too large compared to the power of the overall optical system. Effectively correcting aberration and achieving the desired optical performance becomes difficult. On the other hand, when the value of $f_1/FL$ is greater than the value (0.98) shown in the expression (2), the power of the first lens 3 becomes too small compared to the power of the overall optical system. Size and weight reduction of the overall optical system becomes difficult to achieve.

According to the embodiment, because the second lens 4 is a lens with a negative power in relation to the biconvex first lens 3 whose strong convex surface faces the object side such as to satisfy the expression (1), effective aberration correction through combination of the powers of the first lens 3 and the second lens 4 can be achieved.

Therefore, according to the embodiment, by the value of $r_1/r_2$ being set to satisfy the expression (1) and the value of $f_1/FL$ being set to satisfy the expression (2), productivity can be ensured, aberration can be effectively corrected, and optical performance can be improved while achieving size and weight reduction.

The relationship between $r_1$ and $r_2$ is more preferably $-0.24 \leq r_1/r_2 < -0.1$.

The relationship between $f_1$ and FL is more preferably $0.85 \leq f_1/FL \leq 0.95$.

According to a more preferable embodiment, a condition expressed by a following expression (3) is further satisfied:

$$0.65 \leq d_2/d_1 \leq 1.25 \quad (3)$$

where, $d_1$ in the expression (3) is a center thickness of the first lens 3 (the same applies hereinafter). $d_2$ in the expression (3) is a distance between the first lens 3 and the second lens 4 on an optical axis 6 (the same applies hereinafter).

Here, when the value of $d_2/d_1$ is less than the value (0.65) shown in the expression (3), the distance between the first lens 3 and the second lens 4 becomes too narrow. Inserting a blocking shield or the like between the first lens 3 and the second lens 4 to effectively block unnecessary light becomes difficult. In addition, edge sections of respective optical surfaces of the first lens 3 and the second lens 4 become too close to each other, thereby increasing generation of unnecessary light. On the other hand, when the value of $d_2/d_1$ is greater than the value (1.25) shown in the expression (3), the center thickness of the first lens 3 becomes too thin. Manufacturing the first lens 3 becomes difficult when the first lens 3 is manufactured by injection molding.

Therefore, by the value of $d_2/d_1$ being set to satisfy the expression (3), a means for effectively blocking unnecessary light can be appropriately employed while maintaining productivity.

The relationship between $d_1$ and $d_2$ is more preferably $0.65 \leq d_2/d_1 \leq 1.1$.

According to a more preferable embodiment, a condition expressed by a following expression (4) is further satisfied:

$$0.65 \leq d_2/d_3 \leq 1.2 \quad (4)$$

where, $d_3$ in the expression (4) is a center thickness of the second lens 4 (the same applies hereinafter).

Here, when the value of $d_2/d_3$ is less than the value (0.65) shown in the expression (4), the distance between the first lens 3 and the second lens 4 becomes too narrow. Inserting a blocking shield or the like between the first lens 3 and the second lens 4 to effectively block unnecessary light becomes difficult. In addition, the edge sections of respective optical surfaces of the first lens 3 and the second lens 4 become too close to each other, thereby increasing generation of unnecessary light. On the other hand, when the value of $d_2/d_3$ is greater than the value (1.2) shown in the expression (4), the center thickness of the second lens 4 becomes too thin. Manufacturing the second lens 4 becomes difficult when the second lens 4 is manufactured by injection molding.

Therefore, by the value of $d_2/d_3$ being set to satisfy the expression (4), a means for effectively blocking unnecessary light can be appropriately employed while maintaining productivity.

The relationship between $d_2$ and $d_3$ is more preferably $0.65 \leq d_2/d_3 \leq 1.1$.

According to a more preferable embodiment, a condition expressed by a following expression (5) is further satisfied:

$$0.1 \leq d_1/FL \leq 0.3 \quad (5).$$

Here, when the value of $d_1/FL$ is less than the value (0.1) shown in the expression (5), the center thickness of the first lens 3 becomes too thin. Manufacturing the first lens 3 becomes difficult when the first lens 3 is manufactured by injection molding On the other hand, when the value of $d_1/FL$ is greater than the value (0.3) shown in the expression (5), the center thickness of the first lens 3 becomes too thick compared to the overall length of the optical system. Size and weight reduction becomes difficult to achieve.

Therefore, by the value of $d_1/FL$ being set to satisfy the expression (5), excellent balance can be further achieved between size and weight reduction and maintenance of productivity.

The relationship between $d_1$ and FL is more preferably $0.15 \leq d_1/FL \leq 0.3$.

According to a more preferable embodiment, a condition expressed by a following expression (6) is further satisfied:

$$0.1 \leq d_3/FL \leq 0.3 \quad (6).$$

Here, when the value of $d_3/FL$ is less than the value (0.1) shown in the expression (6), the center thickness of the second lens 4 becomes too thin. Manufacturing the second lens 4 becomes difficult when the second lens 4 is manufactured by injection molding. On the other hand, when the value of $d_3/FL$ is greater than the value (0.3) shown in the expression (6), the center thickness of the second lens 4 becomes too thick compared to the overall length of the optical system. Size and weight reduction becomes difficult to achieve.

Therefore, by the value of $d_3/FL$ being set to satisfy the expression (6), productivity can be maintained while more effectively reducing size and weight.

The relationship between $d_3$ and FL is more preferably $0.15 \leq d_3/FL \leq 0.3$.

According to a more preferable embodiment, a condition expressed by a following expression (7) is further satisfied:

$$0.9 \leq L/FL \leq 1.2 \quad (7)$$

where, L in the expression (7) is an overall length of the lens system or, in other words, a distance from the surface closest to the object side to the image-taking surface 5 on the optical axis 6 (equivalent air length) (the same applies hereinafter).

Here, when the value of L/FL is less than the value (0.9) shown in the expression (7), the overall length of the optical system becomes too short. Productivity during an assembly process of each of the lenses 3 and 4 deteriorates. On the other hand, when the value of L/FL is greater than the value (1.2) shown in the expression (7), the overall length of the optical system becomes too long. Mounting in a small camera of a mobile phone or the like becomes difficult.

Therefore, by the value of L/FL being set to satisfy the expression (7), balance can be more effectively achieved between size and weight reduction and maintenance of productivity.

The relationship between L and FL is more preferably $1 \leq L/FL \leq 1.2$.

A resin material of any composition can be used to form the first lens 3 and the second lens 4 as long as the material has transparency and can be used to form optical components, such as acrylic, polycarbonate, and amorphous polyolefin resin. To further improve production efficiency and further reduce manufacturing costs, the same resin material is preferably used to form both lenses 3 and 4.

EXAMPLES

Next, EXAMPLES of the present invention will be described by referring to FIG. 2 to FIG. 27.

In the EXAMPLES, Fno denotes F number and r denotes the curvature radius of the optical surface (the center radius curvature in the case of a lens). Further, d denotes a distance to the next optical surface on the optical axis 6, nd denotes the index of refraction when the d line (yellow) is irradiated, and vd denotes the Abbe number of each optical system also when the d line is irradiated.

k, A, B, C, and D denote each coefficient in a following expression (8). Specifically, the shape of the aspherical surface of the lens is expressed by the following expression provided that the direction of the optical axis 6 is taken as the Z axis, the direction orthogonal to the optical axis 6 is taken as the X axis, the traveling direction of light is positive, k is the constant of cone, A, B, C, and D are the aspherical coefficients, and r is the curvature radius.

$$Z(X) = r^{-1}X^2/[1 + \{1-(k+1)r^{-2}X^2\}^{1/2}] + AX^4 + BX^6 + CX^8 + DX^{10} \quad (8)$$

In the following EXAMPLES, reference code E used for a numerical value denoting the constant of cone and the aspherical coefficient indicates that the numerical value following E is an exponent having 10 as the base and that the numerical value before E is multiplied by the numerical value denoted by the exponent having 10 as the base. For example, 2.46E+1 denotes $2.46 \times 10^1$.

First Example

FIG. 2 shows a FIRST EXAMPLE of the present invention. The lens 1 in the FIRST EXAMPLE is identical with the lens 1 whose composition is shown in FIG. 1. In the FIRST EXAMPLE, a surface apex (a point intersecting with an optical axis 6) and surrounding area of a first face 3a of the first lens 3 passes through the diaphragm 2 and is positioned closest to the object side.

The imaging lens 1 of the FIRST EXAMPLE was set under the following condition.

| Lens Data |
|---|
| L = 1.44 mm, FL = 1.26 mm, $f_1$ = 1.163 mm, $f_2$ = −8.12 mm, Fno = 2.8 |

| Face Number (Object Point) | r | d | nd | vd |
|---|---|---|---|---|
| 1 (Diaphragm) | ∞ | −0.020 | | |
| 2 (First Face of First Lens) | 0.675 | 0.290 | 1.531 | 56.0 |
| 3 (Second lens of First lens) | −6.500 | 0.295 | | |
| 4 (First Face of Second Lens 4) | −4.750 | 0.280 | 1.531 | 56.0 |
| 5 (Second Face of Second Lens) | 50.000 | | | |
| (Imaging Surface) | | | | |

| Face Number | k | A | B | C | D |
|---|---|---|---|---|---|
| 2 | 0 | −2.01 | 2.46E+1 | −6.92E+2 | 4.66E+3 |
| 3 | 0 | −2.23 | −6.62E+1 | 1.21E+3 | −1.56E+4 |
| 4 | 0 | −3.36 | −1.67E+2 | 4.43E+3 | −8.44E+4 |
| 5 | 0 | −4.03E−1 | −4.32E+1 | 4.98E+2 | −3.40E+3 |

Under such conditions, $r_1/r_2 = -0.104$ was achieved, thereby satisfying the expression (1). $f_1/FL = 0.923$ was achieved, thereby satisfying the expression (2). $d_2/d_1 = 1.02$ was achieved, thereby satisfying the expression (3). $d_2/d_3 = 1.05$ was achieved, thereby satisfying the expression (4). $d_1/FL = 0.23$ was achieved, thereby satisfying the expression (5). $d_3/FL = 0.22$ was achieved, thereby satisfying the expression (6). L/FL = 1.143 was achieved, thereby satisfying the expression (7).

FIG. 3 shows the astigmatism and distortion of the imaging lens 1 of the FIRST EXAMPLE.

According to the result, each of the astigmatism and distortion was almost satisfied. It can be seen from the result that a sufficient optical property can be obtained.

Second Example

FIG. 4 shows a SECOND EXAMPLE of the present invention. In the SECOND EXAMPLE, a surface apex and surrounding area of a first face 3a of the first lens 3 passes through the diaphragm 2 and is positioned closest to the object side.

The imaging lens 1 of the SECOND EXAMPLE was set under the following condition.

Lens Data

L = 1.95 mm, FL = 1.67 mm, $f_1$ = 1.505 mm, $f_2$ = −9.376 mm, Fno = 2.8

| Face Number (Object Point) | r | d | nd | vd |
|---|---|---|---|---|
| 1 (Diaphragm) | ∞ | −0.020 | | |
| 2 (First Face of First Lens) | 0.880 | 0.450 | 1.531 | 56.0 |
| 3 (Second Face of First Lens) | −7.500 | 0.310 | | |
| 4 (First Face of Second Lens) | −5.000 | 0.450 | 1.531 | 56.0 |
| 5 (Second Face of Second Lens) | ∞ | | | |

| (Image Surface) Face Number | k | A | B | C | D |
|---|---|---|---|---|---|
| 2 | 0 | −1.10 | 1.95E+1 | −3.36E+2 | 1.94E+3 |
| 3 | 0 | −1.01 | −2.05E+1 | 2.20E+2 | −1.35E+3 |
| 4 | 0 | −4.20E−1 | −8.61E+1 | 1.47E+3 | −1.50E+4 |
| 5 | 0 | 6.37E−1 | −2.15E+1 | 1.61E+2 | −6.57E+2 |

Under such conditions, $r_1/r_2$=−0.117 was achieved, thereby satisfying the expression (1). $f_1$/FL=0.901 was achieved, thereby satisfying the expression (2). $d_2/d_1$=0.69 was achieved, thereby satisfying the expression (3). $d_2/d_3$=0.69 was achieved, thereby satisfying the expression (4). $d_1$/FL=0.27 was achieved, thereby satisfying the expression (5). $d_3$/FL=0.27 was achieved, thereby satisfying the expression (6). L/FL=1.168 was achieved, thereby satisfying the expression (7).

FIG. 5 shows the astigmatism and distortion of the imaging lens 1 of the SECOND EXAMPLE.

According to the result, each of the astigmatism and distortion was almost satisfied. It can be seen from the result that a sufficient optical property can be obtained.

Third Example

FIG. 6 shows a THIRD EXAMPLE of the present invention. In the THIRD EXAMPLE, a surface apex and surrounding area of a first face 3a of the first lens 3 passes through the diaphragm 2 and is positioned closest to the object side.

The imaging lens 1 of the THIRD EXAMPLE was set under the following condition.

Lens Data

L = 1.67 mm, FL = 1.4646 mm, $f_1$ = 1.358 mm, $f_2$ = −11.79 mm, Fno = 2.8

| Face Number (Object Point) | r | d | nd | vd |
|---|---|---|---|---|
| 1 (Diaphragm) | ∞ | −0.020 | | |
| 2 (First Face of First Lens) | 0.800 | 0.340 | 1.531 | 56.0 |
| 3 (Second Face of First Lens) | −6.500 | 0.350 | | |
| 4 (First Face of Second Lens) | −5.000 | 0.320 | 1.531 | 56.0 |
| 5 (Second Face of Second Lens) | −25.000 | | | |

| (Image Surface) Face Number | k | A | B | C | D |
|---|---|---|---|---|---|
| 2 | 0 | −1.18 | 4.17 | −4.27E+1 | −2.22E+2 |
| 3 | 0 | −6.92E−1 | −4.53E+1 | 5.38E+2 | −3.56E+3 |
| 4 | 0 | −1.93E−1 | −1.31E+2 | 2.19E+3 | −2.34E+4 |
| 5 | 0 | 1.75E−1 | −2.64E+1 | 1.96E+2 | −7.50E+2 |

Under such conditions, $r_1/r_2$=−0.123 was achieved, thereby satisfying the expression (1). $f_1$/FL=0.927 was achieved, thereby satisfying the expression (2). $d_2/d_1$=1.03 was achieved, thereby satisfying the expression (3). $d_2/d_3$=1.09 was achieved, thereby satisfying the expression (4). $d_1$/FL=0.23 was achieved, thereby satisfying the expression (5). $d_3$/FL=0.22 was achieved, thereby satisfying the expression (6). L/FL=1.140 was achieved, thereby satisfying the expression (7).

FIG. 7 shows the astigmatism and distortion of the imaging lens 1 of the THIRD EXAMPLE.

According to the result, each of the astigmatism and distortion was almost satisfied. It can be seen from the result that a sufficient optical property can be obtained.

Fourth Example

FIG. 8 shows a FOURTH EXAMPLE of the present invention. In the FOURTH EXAMPLE, a surface apex and surrounding area of a first face 3a of the first lens 3 passes through the diaphragm 2 and is positioned closest to the object side.

The imaging lens 1 of the FOURTH EXAMPLE was set under the following condition.

Lens Data

L = 1.84 mm, FL = 1.55 mm, $f_1$ = 1.403 mm, $f_2$ = −9.469 mm, Fno = 2.8

| Face Number (Object Point) | r | d | nd | vd |
|---|---|---|---|---|
| 1 (Diaphragm) | ∞ | −0.020 | | |
| 2 (First Face of First Lens) | 0.825 | 0.450 | 1.531 | 56.0 |
| 3 (Second Face of First Lens) | −6.500 | 0.310 | | |
| 4 (First Face of Second Lens) | −4.000 | 0.450 | 1.531 | 56.0 |
| 5 (Second Face of Second Lens) | −20.000 | | | |

| (Image Surface) Face Number | k | A | B | C | D |
|---|---|---|---|---|---|
| 2 | 0 | −8.65E−1 | 1.05E+1 | −1.77E+2 | 9.61E+2 |
| 3 | 0 | −1.10 | −1.47E+1 | 9.39E+1 | −3.27E+2 |
| 4 | 0 | −1.34 | −6.47E+1 | 1.04E+3 | −1.08E+4 |
| 5 | 0 | 1.55E−1 | −1.47E+1 | 9.84E+1 | −3.54E+2 |

Under such conditions, $r_1/r_2$=−0.127 was achieved, thereby satisfying the expression (1). $f_1$/FL=0.905 was achieved, thereby satisfying the expression (2). $d_2/d_1$=0.69 was achieved, thereby satisfying the expression (3). $d_2/d_3$=0.69 was achieved, thereby satisfying the expression (4). $d_1$/FL=0.29 was achieved, thereby satisfying the expression (5). $d_3$/FL=0.29 was achieved, thereby satisfying the expression (6). L/FL=1.187 was achieved, thereby satisfying the expression (7).

FIG. 9 shows the astigmatism and distortion of the imaging lens 1 of the FOURTH EXAMPLE.

According to the result, each of the astigmatism and distortion was almost satisfied. It can be seen from the result that a sufficient optical property can be obtained.

Fifth Example

FIG. 10 shows a FIFTH EXAMPLE of the present invention. In the FIFTH EXAMPLE, a surface apex and surrounding area of a first face 3a of the first lens 3 passes through the diaphragm 2 and is positioned closest to the object side.

The imaging lens 1 of the FIFTH EXAMPLE was set under the following condition.

Lens Data

L = 2.04 mm, FL = 1.798 mm, $f_1$ = 1.586 mm, $f_2$ = −8.502 mm, Fno = 2.8

| Face Number (Object Point) | r | d | nd | vd |
|---|---|---|---|---|
| 1 (Diaphragm) | ∞ | −0.020 | | |
| 2 (First Face of First Lens) | 0.950 | 0.430 | 1.531 | 56.0 |
| 3 (Second Face of First Lens) | −6.500 | 0.310 | | |
| 4 (First Face of Second Lens) | −5.000 | 0.400 | 1.531 | 56.0 |
| 5 (Second Face of Second Lens) | 50.000 | | | |

| (Image Surface) Face Number | k | A | B | C | D |
|---|---|---|---|---|---|
| 2 | 0 | −1.10 | 1.79E+1 | −3.43E+2 | 2.30E+3 |
| 3 | 0 | −1.35 | −1.68E+1 | 1.95E+2 | −1.61E+3 |
| 4 | 0 | −1.24 | −6.67E+1 | 1.23E+3 | −1.39E+4 |
| 5 | 0 | −7.85E−3 | −1.47E+1 | 1.28E+2 | −6.29E+2 |

Under such conditions, $r_1/r_2$=−0.146 was achieved, thereby satisfying the expression (1). $f_1/FL$=0.882 was achieved, thereby satisfying the expression (2). $d_2/d_1$=0.72 was achieved, thereby satisfying the expression (3). $d_2/d_3$=0.78 was achieved, thereby satisfying the expression (4). $d_1/FL$=0.24 was achieved, thereby satisfying the expression (5). $d_3/FL$=0.22 was achieved, thereby satisfying the expression (6). L/FL=1.135 was achieved, thereby satisfying the expression (7).

FIG. 11 shows the astigmatism and distortion of the imaging lens 1 of the FIFTH EXAMPLE.

According to the result, each of the astigmatism and distortion was almost satisfied. It can be seen from the result that a sufficient optical property can be obtained.

Sixth Example

FIG. 12 shows a SIXTH EXAMPLE of the present invention. In the SIXTH EXAMPLE, a surface apex and surrounding area of a first face 3a of the first lens 3 passes through the diaphragm 2 and is positioned closest to the object side.

The imaging lens 1 of the SIXTH EXAMPLE was set under the following condition.

Lens Data

L = 1.78 mm, FL = 1.536 mm, $f_1$ = 1.396 mm, $f_2$ = −9.376 mm, Fno = 2.8

| Face Number (Object Point) | r | d | nd | vd |
|---|---|---|---|---|
| 1 (Diaphragm) | ∞ | −0.020 | | |
| 2 (First Face of First Lens) | 0.850 | 0.400 | 1.531 | 56.0 |
| 3 (Second Face of First Lens) | −5.000 | 0.310 | | |
| 4 (First Face of Second Lens) | −5.000 | 0.350 | 1.531 | 56.0 |
| 5 (Second Face of Second Lens) | ∞ | | | |

| (Image Surface) Face Number | k | A | B | C | D |
|---|---|---|---|---|---|
| 2 | 0 | −1.20 | 1.40E+1 | −2.42E+2 | 1.33E+3 |
| 3 | 0 | −1.29 | −2.55E+1 | 2.77E+2 | −2.14E+3 |
| 4 | 0 | −1.61 | −7.83E+1 | 1.28E+3 | −1.33E+4 |
| 5 | 0 | −1.98E−1 | −1.74E+1 | 1.44E+2 | −6.59E+2 |

Under such conditions, $r_1/r_2$=−0.170 was achieved, thereby satisfying the expression (1). $f_1/FL$=0.909 was achieved, thereby satisfying the expression (2). $d_2/d_1$=0.78 was achieved, thereby satisfying the expression (3). $d_2/d_3$=0.89 was achieved, thereby satisfying the expression (4). $d_1/FL$=0.26 was achieved, thereby satisfying the expression (5). $d_2/FL$=0.23 was achieved, thereby satisfying the expression (6). L/FL=1.159 was achieved, thereby satisfying the expression (7).

FIG. 13 shows the astigmatism and distortion of the imaging lens 1 of the SIXTH EXAMPLE.

According to the result, each of the astigmatism and distortion was almost satisfied. It can be seen from the result that a sufficient optical property can be obtained.

Seventh Example

FIG. 14 shows a SEVENTH EXAMPLE of the present invention. In the SEVENTH EXAMPLE, a surface apex and surrounding area of a first face 3a of the first lens 3 passes through the diaphragm 2 and is positioned closest to the object side.

The imaging lens 1 of the SEVENTH EXAMPLE was set under the following condition.

Lens Data

L = 1.93 mm, FL = 1.639 mm, $f_1$ = 1.469 mm, $f_2$ = −9.469 mm, Fno = 2.8

| Face Number (Object Point) | r | d | nd | vd |
|---|---|---|---|---|
| 1 (Diaphragm) | ∞ | −0.020 | | |
| 2 (First Face of First Lens) | 0.900 | 0.450 | 1.531 | 56.0 |
| 3 (Second Face of First Lens) | −5.000 | 0.310 | | |
| 4 (First Face of Second Lens) | −4.000 | 0.450 | 1.531 | 56.0 |
| 5 (Second Face of Second Lens) | −20.000 | | | |

| (Image Surface) Face Number | k | A | B | C | D |
|---|---|---|---|---|---|
| 2 | 0 | −1.10 | 1.95E+1 | −3.36E+2 | 1.94E+3 |
| 3 | 0 | −1.01 | −2.05E+1 | 2.20E+2 | −1.35E+3 |
| 4 | 0 | −4.20E−1 | −8.61E+1 | 1.47E+3 | −1.50E+4 |
| 5 | 0 | 6.37E−1 | −2.15E+1 | 1.61E+2 | −6.57E+2 |

Under such conditions, $r_1/r_2$=−0.180 was achieved, thereby satisfying the expression (1). $f_1/FL$=0.896 was achieved, thereby satisfying the expression (2). $d_2/d_1$=0.69 was achieved, thereby satisfying the expression (3). $d_2/d_3$=0.69 was achieved, thereby satisfying the expression (4). $d_1/FL$=0.27 was achieved, thereby satisfying the expression (5). $d_3/FL$=0.27 was achieved, thereby satisfying the expression (6). L/FL=1.178 was achieved, thereby satisfying the expression (7).

FIG. 15 shows the astigmatism and distortion of the imaging lens 1 of the SEVENTH EXAMPLE.

According to the result, each of the astigmatism and distortion was almost satisfied. It can be seen from the result that a sufficient optical property can be obtained.

Eighth Example

FIG. 16 shows a EIGHTH EXAMPLE of the present invention. In the EIGHTH EXAMPLE, a surface apex and surrounding area of a first face 3a of the first lens 3 passes through the diaphragm 2 and is positioned closest to the object side.

The imaging lens 1 of the EIGHTH EXAMPLE was set under the following condition.

| Lens Data | | | | |
|---|---|---|---|---|
| L = 1.68 mm, FL = 1.489 mm, $f_1$ = 1.316 mm, $f_2$ = −6.205 mm, Fno = 2.8 | | | | |

| Face Number (Object Point) | r | d | nd | vd |
|---|---|---|---|---|
| 1 (Diaphragm) | ∞ | −0.020 | | |
| 2 (First Face of First Lens) | 0.825 | 0.350 | 1.531 | 56.0 |
| 3 (Second Face of First Lens) | −4.000 | 0.330 | | |
| 4 (First Face of Second Lens) | −5.000 | 0.320 | 1.531 | 56.0 |
| 5 (Second Face of Second Lens) | 10.000 | | | |

| (Image Surface) Face Number | k | A | B | C | D |
|---|---|---|---|---|---|
| 2 | 0 | −2.56 | 9.19E+1 | −2.50E+3 | 3.02E+4 |
| 3 | 0 | −1.33 | −3.47E+1 | 5.18E+2 | −5.97E+3 |
| 4 | 0 | −9.12E−1 | −1.30E+2 | 2.49E+3 | −2.90E+4 |
| 5 | 0 | −5.60E−1 | −1.61E+1 | 1.40E+2 | −6.60E+2 |

Under such conditions, $r_1/r_2$=−0.206 was achieved, thereby satisfying the expression (1). $f_1/FL$=0.884 was achieved, thereby satisfying the expression (2). $d_2/d_1$=0.94 was achieved, thereby satisfying the expression (3). $d_2/d_3$=1.03 was achieved, thereby satisfying the expression (4). $d_1/FL$=0.24 was achieved, thereby satisfying the expression (5). $d_3/FL$=0.21 was achieved, thereby satisfying the expression (6). L/FL=1.128 was achieved, thereby satisfying the expression (7).

FIG. 17 shows the astigmatism and distortion of the imaging lens 1 of the EIGHTH EXAMPLE.

According to the result, each of the astigmatism and distortion was almost satisfied. It can be seen from the result that a sufficient optical property can be obtained.

Ninth Example

FIG. 18 shows a NINTH EXAMPLE of the present invention. In the NINTH EXAMPLE, a surface apex and surrounding area of a first face 3a of the first lens 3 passes through the diaphragm 2 and is positioned closest to the object side.

The imaging lens 1 of the NINTH EXAMPLE was set under the following condition.

| Lens Data | | | | |
|---|---|---|---|---|
| L = 1.89 mm, FL = 1.637 mm, $f_1$ = 1.569 mm, $f_2$ = −28.29 mm, Fno = 2.8 | | | | |

| Face Number (Object Point) | r | d | nd | vd |
|---|---|---|---|---|
| 1 (Diaphragm) | ∞ | −0.020 | | |
| 2 (First Face of First Lens) | 1.000 | 0.350 | 1.531 | 56.0 |
| 3 (Second Face of First Lens) | −4.500 | 0.310 | | |
| 4 (First Face of Second Lens) | −10.000 | 0.320 | 1.531 | 56.0 |
| 5 (Second Face of Second Lens) | −30.000 | | | |

| (Image Surface) Face Number | k | A | B | C | D |
|---|---|---|---|---|---|
| 2 | 0 | −1.14 | 4.49 | −1.38E+2 | 9.60E+2 |
| 3 | 0 | −1.69 | −2.41E+1 | 3.38E+2 | −2.96E+3 |
| 4 | 0 | −3.13 | −9.68 | 5.11E+2 | −1.44E+4 |
| 5 | 0 | −4.69E−1 | −1.16E+1 | 1.34E+2 | −9.83E+2 |

Under such conditions, $r_1/r_2$=−0.222 was achieved, thereby satisfying the expression (1). $f_1/FL$=0.958 was achieved, thereby satisfying the expression (2). $d_2/d_1$=0.89 was achieved, thereby satisfying the expression (3). $d_2/d_3$=0.97 was achieved, thereby satisfying the expression (4). $d_1/FL$=0.21 was achieved, thereby satisfying the expression (5). $d_3/FL$=0.20 was achieved, thereby satisfying the expression (6). L/FL=1.155 was achieved, thereby satisfying the expression (7).

FIG. 19 shows the astigmatism and distortion of the imaging lens 1 of the NINTH EXAMPLE.

According to the result, each of the astigmatism and distortion was almost satisfied. It can be seen from the result that a sufficient optical property can be obtained.

Tenth Example

FIG. 20 shows a TENTH EXAMPLE of the present invention. In the TENTH EXAMPLE, a surface apex and surrounding area of a first face 3a of the first lens 3 passes through the diaphragm 2 and is positioned closest to the object side.

The imaging lens 1 of the TENTH EXAMPLE was set under the following condition.

| Lens Data | | | | |
|---|---|---|---|---|
| L = 1.41 mm, FL = 1.21 mm, $f_1$ = 1.1645 mm, $f_2$ = −20.07 mm, Fno = 2.8 | | | | |

| Face Number (Object Point) | r | d | nd | vd |
|---|---|---|---|---|
| 1 (Diaphragm) | ∞ | −0.010 | | |
| 2 (First Face of First Lens) | 0.700 | 0.275 | 1.531 | 56.0 |
| 3 (Second Face of First Lens) | −3.150 | 0.235 | | |
| 4 (First Face of Second Lens) | −12.500 | 0.250 | 1.531 | 56.0 |
| 5 (Second Face of Second Lens) | 75.000 | | | |

| (Image Surface) Face Number | k | A | B | C | D |
|---|---|---|---|---|---|
| 2 | 0 | −2.07 | −1.53E+1 | 1.98E+2 | −3.00E+3 |
| 3 | 0 | −3.93 | −7.46E+1 | 1.55E+3 | −2.34E+4 |

-continued

| | | | | | |
|---|---|---|---|---|---|
| 4 | 0 | −7.72 | −1.47E+1 | 2.64E+3 | −1.35E+5 |
| 5 | 0 | −1.12 | −3.50E+1 | 5.93E+2 | −6.60E+3 |

Under such conditions, $r_1/r_2 = -0.222$ was achieved, thereby satisfying the expression (1). $f_1/FL = 0.962$ was achieved, thereby satisfying the expression (2). $d_2/d_1 = 0.85$ was achieved, thereby satisfying the expression (3). $d_2/d_3 = 0.94$ was achieved, thereby satisfying the expression (4). $d_1/FL = 0.23$ was achieved, thereby satisfying the expression (5). $d_3/FL = 0.21$ was achieved, thereby satisfying the expression (6). $L/FL = 1.165$ was achieved, thereby satisfying the expression (7).

FIG. 21 shows the astigmatism and distortion of the imaging lens 1 of the TENTH EXAMPLE.

According to the result, each of the astigmatism and distortion was almost satisfied. It can be seen from the result that a sufficient optical property can be obtained.

Eleventh Example

FIG. 22 shows a ELEVENTH EXAMPLE of the present invention. In the ELEVENTH EXAMPLE, a surface apex a surface apex and surrounding area of a first face 3a of the first lens 3 passes through the diaphragm 2 and is positioned closest to the object side.

The imaging lens 1 of the ELEVENTH EXAMPLE was set under the following condition.

| Lens Data |
|---|
| L = 1.67 mm, FL = 1.482 mm, $f_1$ = 1.241 mm, $f_2$ = −4.688 mm, Fno = 2.8 |

| Face Number (Object Point) | r | d | nd | vd |
|---|---|---|---|---|
| 1 (Diaphragm) | ∞ | −0.020 | | |
| 2 (First Face of First Lens) | 0.800 | 0.350 | 1.531 | 56.0 |
| 3 (Second Face of First Lens) | −3.250 | 0.290 | | |
| 4 (First Face of Second Lens) | −2.500 | 0.350 | 1.531 | 56.0 |
| 5 (Second Face of Second Lens) | ∞ | | | |

| (Image Surface) Face Number | k | A | B | C | D |
|---|---|---|---|---|---|
| 2 | 0 | −2.43 | 8.01E+1 | −2.27E+3 | 2.84E+4 |
| 3 | 0 | −1.64 | −4.14E+1 | 5.95E+2 | −6.59E+3 |
| 4 | 0 | −2.18 | −1.12E+2 | 2.20E+3 | −2.86E+4 |
| 5 | 0 | −4.41E−1 | −1.76E+1 | 1.68E+2 | −8.88E+2 |

Under such conditions, $r_1/r_2 = -0.246$ was achieved, thereby satisfying the expression (1). $f_1/FL = 0.837$ was achieved, thereby satisfying the expression (2). $d_2/d_1 = 0.83$ was achieved, thereby satisfying the expression (3). $d_2/d_3 = 0.83$ was achieved, thereby satisfying the expression (4). $d_1/FL = 0.24$ was achieved, thereby satisfying the expression (5). $d_3/FL = 0.24$ was achieved, thereby satisfying the expression (6). $L/FL = 1.127$ was achieved, thereby satisfying the expression (7).

FIG. 23 shows the astigmatism and distortion of the imaging lens 1 of the ELEVENTH EXAMPLE.

According to the result, each of the astigmatism and distortion was almost satisfied. It can be seen from the result that a sufficient optical property can be obtained.

Twelfth Example

FIG. 24 shows a TWELFTH EXAMPLE of the present invention. In the TWELFTH EXAMPLE, a surface apex and surrounding area of a first face 3a of the first lens 3 passes through the diaphragm 2 and is positioned closest to the object side.

The imaging lens 1 of the TWELFTH EXAMPLE was set under the following condition.

| Lens Data |
|---|
| L = 1.45 mm, FL = 1.244 mm, $f_1$ = 1.193 mm, $f_2$ = −22.67 mm, Fno = 2.8 |

| Face Number (Object Point) | r | d | nd | vd |
|---|---|---|---|---|
| 1 (Diaphragm) | ∞ | 0.000 | | |
| 2 (First Face of First Lens) | 0.785 | 0.270 | 1.531 | 56.0 |
| 3 (Second Face of First Lens) | −2.950 | 0.210 | | |
| 4 (First Face of Second Lens) | −7.500 | 0.260 | 1.531 | 56.0 |
| 5 (Second Face of Second Lens) | −20.00 | | | |

| (Image Surface) Face Number | k | A | B | C | D |
|---|---|---|---|---|---|
| 2 | 0 | −2.28 | −1.32E+1 | 2.05E+1 | −1.31E+2 |
| 3 | 0 | −4.28 | −9.55E+1 | 2.21E+3 | −3.09E+4 |
| 4 | 0 | −8.07 | 1.01E+1 | 1.84E+3 | −1.25E+5 |
| 5 | 0 | −1.02 | −3.21E+1 | 6.26E+2 | −7.75E+3 |

Under such conditions, $r_1/r_2 = -0.266$ was achieved, thereby satisfying the expression (1). $f_1/FL = 0.959$ was achieved, thereby satisfying the expression (2). $d_2/d_1 = 0.78$ was achieved, thereby satisfying the expression (3). $d_2/d_3 = 0.81$ was achieved, thereby satisfying the expression (4). $d_1/FL = 0.22$ was achieved, thereby satisfying the expression (5). $d_3/FL = 0.21$ was achieved, thereby satisfying the expression (6). $L/FL = 1.166$ was achieved, thereby satisfying the expression (7).

FIG. 25 shows the astigmatism and distortion of the imaging lens 1 of the TWELFTH EXAMPLE.

According to the result, each of the astigmatism and distortion was almost satisfied. It can be seen from the result that a sufficient optical property can be obtained.

Thirteenth Example

FIG. 26 shows a THIRTEENTH EXAMPLE of the present invention. In the THIRTEENTH EXAMPLE, a surface apex and surrounding area of a first face 3a of the first lens 3 passes through the diaphragm 2 and is positioned closest to the object side.

The imaging lens 1 of the THIRTEENTH EXAMPLE was set under the following condition.

| Lens Data |
|---|
| L = 1.70 mm, FL = 1.497 mm, $f_1$ = 1.283 mm, $f_2$ = −5.287 mm, Fno = 2.8 |

| Face Number (Object Point) | r | d | nd | vd |
|---|---|---|---|---|
| 1 (Diaphragm) | ∞ | −0.020 | | |
| 2 (First Face of First Lens) | 0.850 | 0.350 | 1.531 | 56.0 |
| 3 (Second Face of First Lens) | −3.000 | 0.300 | | |

-continued

| Face Number | | | | |
|---|---|---|---|---|
| 4 (First Face of Second Lens) | −3.500 | 0.350 | 1.531 | 56.0 |
| 5 (Second Face of Second Lens) | 15.000 | | | |

| (Image Surface) Face Number | k | A | B | C | D |
|---|---|---|---|---|---|
| 2 | 0 | −2.55 | 8.67E+1 | −2.41E+3 | 2.96E+4 |
| 3 | 0 | −1.62 | −3.77E+1 | 5.74E+2 | −6.45E+3 |
| 4 | 0 | −2.11 | −9.41E+1 | 1.95E+3 | −2.64E+4 |
| 5 | 0 | −6.14E−1 | −1.21E+1 | 1.15E+2 | −6.15E+2 |

Under such conditions, $r_1/r_2$-0.283 was achieved, thereby satisfying the expression (1). $f_1/FL$=0.857 was achieved, thereby satisfying the expression (2). $d_2/d_1$=0.86 was achieved, thereby satisfying the expression (3). $d_2/d_3$=0.86 was achieved, thereby satisfying the expression (4). $d_1/FL$=0.23 was achieved, thereby satisfying the expression (5). $d_3/FL$=0.23 was achieved, thereby satisfying the expression (6). $L/FL$=1.136 was achieved, thereby satisfying the expression (7).

FIG. 27 shows the astigmatism and distortion of the imaging lens 1 of the THIRTEENTH EXAMPLE.

According to the result, each of the astigmatism and distortion was almost satisfied. It can be seen from the result that a sufficient optical property can be obtained.

The present invention is not limited to the above-described embodiments and EXAMPLES, and various modifications are possible as required.

What is claimed is:

1. An imaging lens used for forming an image of an object on an image-taking surface of an image sensor element consisting of:
in order from an object side to an image surface side, a diaphragm, a first lens that is a biconvex lens, and a second lens that is a lens having a negative power whose concave surface faces the object side, wherein conditions expressed by the following expressions (1), (2) and (5) are to be satisfied:

$$-0.3 \leq r_1/r_2 < -0.1 \tag{1}$$

$$0.8 \leq f_1/FL \leq 0.98 \tag{2}$$

$$0.1 \leq d_1/FL \leq 0.3 \tag{5}$$

where,
$r_1$: center radius curvature of the object side face of the first lens
$r_2$: center radius curvature of the image surface side face of the first lens
$f_1$: focal distance of the first lens
FL: focal distance of the entire lens system
$d_1$: center thickness of the first lens.

2. An imaging lens according to claim 1, wherein, further, a condition expressed by a following expression (3) is to be satisfied:

$$0.65 \leq d_2/d_1 \leq 1.25 \tag{3}$$

where,
$d_1$: center thickness of the first lens
$d_2$: distance between the first lens and the second lens on the optical axis.

3. An imaging lens according to claim 1, wherein, further, a condition expressed by a following expression (4) is to be satisfied:

$$0.65 \leq d_2/d_3 \leq 1.2 \tag{4}$$

where,
$d_2$: distance between the first lens and the second lens on the optical axis
$d_3$: center thickness of the second lens.

4. An imaging lens according to claim 1, wherein, further, a condition expressed by a following expression (6) is to be satisfied:

$$0.1 \leq d_3/FL \leq 0.3 \tag{6}$$

$d_3$: center thickness of the second lens.

5. An imaging lens according to claim 1, wherein, further, a condition expressed by a following expression (7) is to be satisfied:

$$0.9 \leq L/FL \leq 1.2 \tag{7}$$

where,
L: overall length of the lens system (distance from the surface closest to the object side to the image-taking surface on the optical axis: equivalent air length).

* * * * *